United States Patent
Fascenda

(12) 
(10) Patent No.: US 6,466,937 B1
(45) Date of Patent: Oct. 15, 2002

(54) SYSTEM, METHOD AND APPARATUS FOR UTILIZING TRANSACTION DATABASES IN A CLIENT-SERVER ENVIRONMENT

(75) Inventor: Anthony C. Fascenda, Bethesda, MA (US)

(73) Assignee: Aether Systems, Inc., Owings Mills, MD (US)

( * ) Notice: Subject to any disclaimer, the term of this patent is extended or adjusted under 35 U.S.C. 154(b) by 0 days.

(21) Appl. No.: 09/523,165

(22) Filed: Mar. 10, 2000

(51) Int. Cl.[7] .............................................. G06F 17/30
(52) U.S. Cl. ......................................... 707/10; 707/102
(58) Field of Search ..................... 707/1, 2, 10, 103 R, 707/101, 102, 104.1, 513; 709/201, 203, 227, 218, 248

(56) References Cited

U.S. PATENT DOCUMENTS 5,897,622 A * 4/1999 Blinn et al. .................... 705/26
6,225,995 B1 * 5/2001 Jacobs et al. ................ 345/738

\* cited by examiner

*Primary Examiner*—Diane D. Mizrahi
*Assistant Examiner*—Apu M Mofiz
(74) *Attorney, Agent, or Firm*—Wilmer, Cutler & Pickering; John W. Ryan; Ashok K. Mannava

(57) ABSTRACT

A system, method and apparatus for utilizing transaction databases in a client-server environment. The transaction databases can be used to receive and retain multiple server responses to consecutive client requests regardless of the temporal relationship between the multiple responses and consecutive requests. One method of the invention relates to how a client device displays information. This method is for use in a client-server system including one or more servers and a client device having a client transaction database, a client template database, and a user interface adapted to enable a user to enter requests. The method includes the steps of receiving a user request from the user via the user interface and retrieving a template from the client template database based on the user request. The template includes one or more data fields. The method also includes the step of retrieving information from the client transaction database based on the template, wherein the information relates to the one or more data fields of the template. A page is then displayed based on the template and the information relating to the one or more data field.

12 Claims, 19 Drawing Sheets

420

```
| PRECIOUS METALS        14:36      |
|                                   |
| S         5.10/5.24      +0.10    |
| GOLD      28380/480      +0050    |
| PL        43040/43500    -0700    |
| PD        43900/44400    -0400    |
```

PRECIOUS_METALS_TEMPLATE

```
<NT~temp₁, <version~1.1
<TI~PRECIOUS METALS %CT:10:C%
<SILVER%0:11%%1:6%
<GOLD%2:10%%5:6%
<PLATINUM%6:11%%7:6%              436
<PALLADIUM%6:11%%7:6%
<AM~S~Refresh~~p<~temp₁           442
<AK~C~SP~TEMPhome                 444
<EC
```

SERVER TRANSACTION DATABASE TABLE 700

| CLIENT 702 | TEMPLATE IDENTIFIER 703 | TEMPLATE TITLE 704 | TEMPLATE VERSION 706 | INDEX 708 | DATE 710 | TIME 712 | PARAMETERS 714 |
|---|---|---|---|---|---|---|---|
| MAN1 | temp 3 | QUOTE | 1.7 | AAPL | 11.19.1999 | 10.33.21 | DATA 1 |
| MAN1 | temp 3 | QUOTE | 1.7 | IBM | 11.19.1999 | 10.37.36 | DATA 2 |
| MAN1 | temp 8 | SPORTS | 1.3 | YANKEES | 11.20.1999 | 14.22.17 | DATA 3 |
| MAN1 | temp 12 | MOVIES | 1.4 | 20009 | 11.23.1999 | 17.10.03 | DATA 4 |
| MAN1 | temp 6 | +FX | 2.2 | CAN | 12.04.1999 | 08.35.44 | DATA 5 |
| MAN1 | temp 6 | +FX | 2.2 | YEN | 01.03.2000 | 09.42.53 | DATA 6 |
| . | . | . | . | . | . | . | . |
| MAN2 | | | | | | | |
| MAN2 | | | | | | | |
| . | | | | | | | |
| . | | | | | | | |
| MANn | | | | | | | |

FIG. 7A

| TEMPLATE I.D. | VERSION | DEFINITIONS |
|---|---|---|
| temp$_{home}$ | 1.1 | (header, content, actions) |
| temp$_1$ | 1.7 | (header, content, actions) |
| temp$_2$ | 1.6 | (header, content, actions) |
| | | |
| | | |

FIG. 7B

CLIENT TRANSACTION DATABASE TABLE
800

| TEMPLATE IDENTIFIER | TEMPLATE TITLE | TEMPLATE VERSION | INDEX | DATE | TIME | PARAMETERS |
|---|---|---|---|---|---|---|
| $temp_3$ | QUOTE | 1.7 | AAPL | 11.19.1999 | 10.33.21 | DATA 1 |
| $temp_3$ | QUOTE | 1.7 | IBM | 11.19.1999 | 10.37.36 | DATA 2 |
| $temp_8$ | SPORTS | 1.3 | YANKEES | 11.20.1999 | 14.22.17 | DATA 3 |
| $temp_{12}$ | MOVIES | 1.4 | 20009 | 11.23.1999 | 17.10.03 | DATA 4 |
| $temp_6$ | +FX | 2.2 | CAN | 12.04.1999 | 08.35.44 | DATA 5 |
| $temp_6$ | +FX | 2.2 | YEN | 01.03.2000 | 09.42.53 | DATA 6 |
| . | . | . | . | . | . | . |
| . | . | . | . | . | . | . |
| . | . | . | . | . | . | . |

FIG. 8

SYSTEM, METHOD AND APPARATUS FOR UTILIZING TRANSACTION DATABASES IN A CLIENT-SERVER ENVIRONMENT

RELATED APPLICATIONS

The following applications of common assignee may contain some common disclosure and may relate to the present invention:

U.S. patent application Ser. No. 09/195,483, now abandoned entitled "Method and System for Providing Localized Information", filed Nov. 17, 1998; and U.S. patent application Ser. No. 09/195,482, now U.S. Pat. No. 6,304,746 entitled "Method And System For Providing Formatted Information via a Two-way Communications System", filed Nov. 17, 1998, each of which is incorporated herein by reference in its entirety.

Additionally, the following applications of common assignee may contain some common disclosure, and are believed to have an effective filing date identical with that of the present invention:

U.S. pending patent application Ser. No. 09/523,169, entitled "System and Method for Providing Focused Information Based on Implicit and Explicit Information Derived From User Histories;

U.S. pending patent application Ser. No. 09/523,168, entitled "System, Method and Apparatus for Automatically and Dynamically Updating Options, Features, and/or Services Available to a Client Device", U.S. pending patent application Ser. No. 09/523,163, entitled "System and Method for Providing Information that is Responsive to a Freeform Request";

U.S. pending patent application Ser. No. 09/523,170, entitled "System, Method, and Apparatus for Initial Configuration of a Client Device";

U.S. pending patent application Ser. No. 09/523,166, entitled "System, Method, and Apparatus for Providing Value Added to Specific Users"; and U.S. pending patent application Ser. No. 09/523,167, entitled "Method and Apparatus for Providing Services to a User of a Client Device Configured by Templates that Reference other Templates", each of which is incorporated herein by reference in its entirety.

BACKGROUND OF THE INVENTION

1. Field of the Invention

The present invention relates generally to a system including intercommunicating client and server applications, and more particularly, to such a system, a method and an apparatus for maintaining a database of past transactions in a client device.

2. Related Art

A typical client-server environment includes a client application, such as an Internet web-browser, and a server application respectively executing on independent computer based platforms and communicating with one another. The client application submits information requests to the server application in response to user input at the client end. In response, the server transmits information responses to the client application. A user interacts with the client-server environment using a Graphical User Interface (GUI) of the client application.

Often, a user interacts with a browser such that the browser submits numerous consecutive information and/or branch requests over a relatively short period of time to retrieve information and/or navigate through a plurality of service provider sites (such as an Internet web pages). Using a conventional browser (such as Microsoft Explorer), each of the consecutive requests can effectively cancel or negate a previous request, whereby one or more information and/or branch requests are disadvantageously lost to the user. For example, When the user issues a first requests for a first Internet file (e.g., by designating a Uniform Resource Locator (URL)) and then issues a second request for a different Internet file prior to receiving a response to the first request, the conventional browser fails to display a response to the first request even when such a request is received. From the user's perspective, the second request negates the first request. This can also occur when the user navigates through web sites. For example, if the user "clicks" on a first hypertext link and then "clicks" on a second hypertext link prior to a jump to the first link, a jump to the first link fails to occur; thus, initiating the second link effectively negated initiating the first link.

There are many reasons that a user may make consecutive subsequent requests after an initial request. The user may decide that even though the initial request is important, subsequent requests are more important. Alternatively, the user may grow impatient while waiting for a response to the initial request. Whatever the reason, there is a good chance the first request is still of interest to the user.

Therefore, there is a need in a client application to receive and retain multiple server responses to consecutive client requests regardless of the temporal relationship between the multiple responses and consecutive requests. There is a related need in the client to provide the user with a mechanism for retrieving the retained response information and to display such information as necessary.

A large number of client or browser applications can operate in a distributed service environment. A distributed service environment is one in which the numerous client applications interact with one or more server applications, each of the server applications hosting a wide variety of data services provided by a variety of "private" and possibly public service providers. Wireless client devices including the above mentioned client applications can operate in such a distributed service environment.

Therefore, the above mentioned needs also pertain to wireless devices operating in the distributed environment.

SUMMARY OF THE INVENTION

The present invention is directed to a system, method and apparatus for utilizing transaction databases in a client-server environment. In one embodiment, the present invention uses transaction databases to receive and retain multiple server responses to consecutive client requests regardless of the temporal relationship between the multiple responses and consecutive requests.

One embodiment of the present invention is a method used in a client-server system including one or more servers and a client device having a client transaction database and a user interface adapted to enable a user to enter requests. The method enables the client device to accept multiple user requests, receive multiple server responses, and display pages relating to the multiple server responses. The method includes the steps of receiving a first user request from the user via the user interface and sending a first client request based on the first user request. The method also includes the steps of receiving a second user request from the user via the user interface, prior to receiving a response to the first client request, and sending a second client request based on the second user request. When a server response to the first request is received, first information based on the server response (to the first request) is stored in the client transaction database. When a server response to the second request is received, second information based on the server response (to the second request) is stored in the client transaction database.

The method further includes the steps of retrieving one of the first information and the second information from the client transaction database and displaying one of a first display page relating to the first information and a second display page relating to the second information. Then, in response to a further user request from the user via the user interface, the other one of the first information and the second information is retrieved from the client transaction database, and the other one of the first display page and the second display page is displayed. More specifically, in one embodiment, if the server response to the first request is received prior to the server response to the second request, then the first information is retrieved from the client transaction database, and the first display page is displayed. The user can then cause the second information to be retrieved from the client transaction database and displayed by entering a further user request via the user interface. Alternatively, if the server response to the second request is received prior to the server response to the first request, then the second information is retrieved from the client transaction database, and the second display page is displayed. The user can then cause the first information to be retrieved from the client transaction database and displayed by entering a further user request via the user interface. In another embodiment, the display page (i.e., the second display page) relating to the last made client request (i.e., the second client request) is displayed first, regardless of which response was received first. In still another embodiment, a display page relating to the first made client request (i.e., the first client request) is displayed first, regardless of which response was received first.

Another embodiment of the present invention is a method for use in a client-server system including one or more servers and a client device having a client transaction database, a client template database, and a user interface adapted to enable a user to enter requests. The method includes the steps of receiving a user request from the user via the user interface and retrieving a template from the client template database based on the user request. The template includes one or more data fields. The method also includes the step of retrieving information from the client transaction database based on the template, wherein the information relates to the one or more data fields of the template. A page based on the template and the information relating to the one or more data field is then displayed.

The method also includes the steps of receiving a refresh request from the user via the user interface and sending a client request based on the refresh request. Additionally, the method includes the steps of receiving a server response to the client request and storing further information in the client transaction database based on the server response, wherein the further information relates to at least one of the data fields. An updated page is then displayed based on the template and the further information. The updated page can additionally be based on the original information retrieved from the client transaction database.

In another embodiment, the present invention relates to a method for responding to a request from a client device. This method includes the steps of receiving a client request from a client device, wherein the client request includes a template identifier and a client identifier. The method also includes the step of retrieving a template including one or more data fields from a server template database based on the template identifier. The method further includes the steps of collecting first information (e.g., from an information store) relating to the one or more data fields, determining a server response to the request based on the first information, and sending the server response to the client device.

According to another embodiment, the method also includes the steps of retrieving second information from a server transaction database based on the template identifier and the client identifier. In this embodiment the response to the request is determined based on the first information and the second information. For example, in this embodiment the response can be based on differences between the first information and the second information.

A further embodiment of the present invention is directed to a client-server based system for providing a user with information in response to user requests. The system includes a server controller that receives information requests over a communication network and transmits server responses over the communication network in response to the information requests. A client device, coupled to the communication network, is adapted to receive user requests and then transmit the information requests based on the user requests. The client device includes a display for displaying information, wherein the client device is adapted to receive, retain, and display multiple server responses corresponding to consecutive information requests regardless of a temporal relationship between the multiple responses and the consecutive information requests.

Advantages and additional features of the present invention, as well as the structure and operation of various embodiments of the present invention, are described in detail below with reference to the accompanying drawings.

BRIEF DESCRIPTION OF THE FIGURES

The features, objects, and advantages of the present invention will become more apparent from the detailed description set fourth below when taken in conjunction with the drawings in which like reference characters identify corresponding elements throughout and wherein:

FIG. 4C is an illustration of a completed template or display page corresponding to the template of FIG. 4B.

FIG. 4D is an illustration of a list of exemplary definitions or descriptors defining the template of FIG. 4B and the display page of FIG. 4C.

FIG. 7A is an illustration of an exemplary information table stored in a server transaction database used in the logical architecture of FIG. 3.

FIG. 7B is an illustration of an exemplary information table stored in a server template database used in the logical architecture of FIG. 3.

FIG. 8 is an illustration of an exemplary information table stored in a client transaction database of the client device of FIG. 2A.

DETAILED DESCRIPTION OF THE PREFERRED EMBODIMENTS

I. Introduction

The present invention relates to a method and system for automatically initializing and configuring a client device (e.g., a two-way paging device, a wireless phone, a personal data assistant, or a desk top computer). The present invention can be used in a two-way wireless communications system. Additionally, the present invention can be used in various other types of communications system. For example, the present invention can be used with the Internet. In an embodiment where the present invention is used with the Internet, a client device can be, for example, a wireless device that wirelessly accesses the Internet (e.g., a PalmPilot® or a wireless phone) or a personal computer that is wired to the Internet.

Preferred embodiments of the present invention are discussed in detail below. While specific steps, configurations and arrangements are discussed, it should be understood that this is done for illustrative purposes only.

II. Exemplary Communications Systems

Figure 1A:
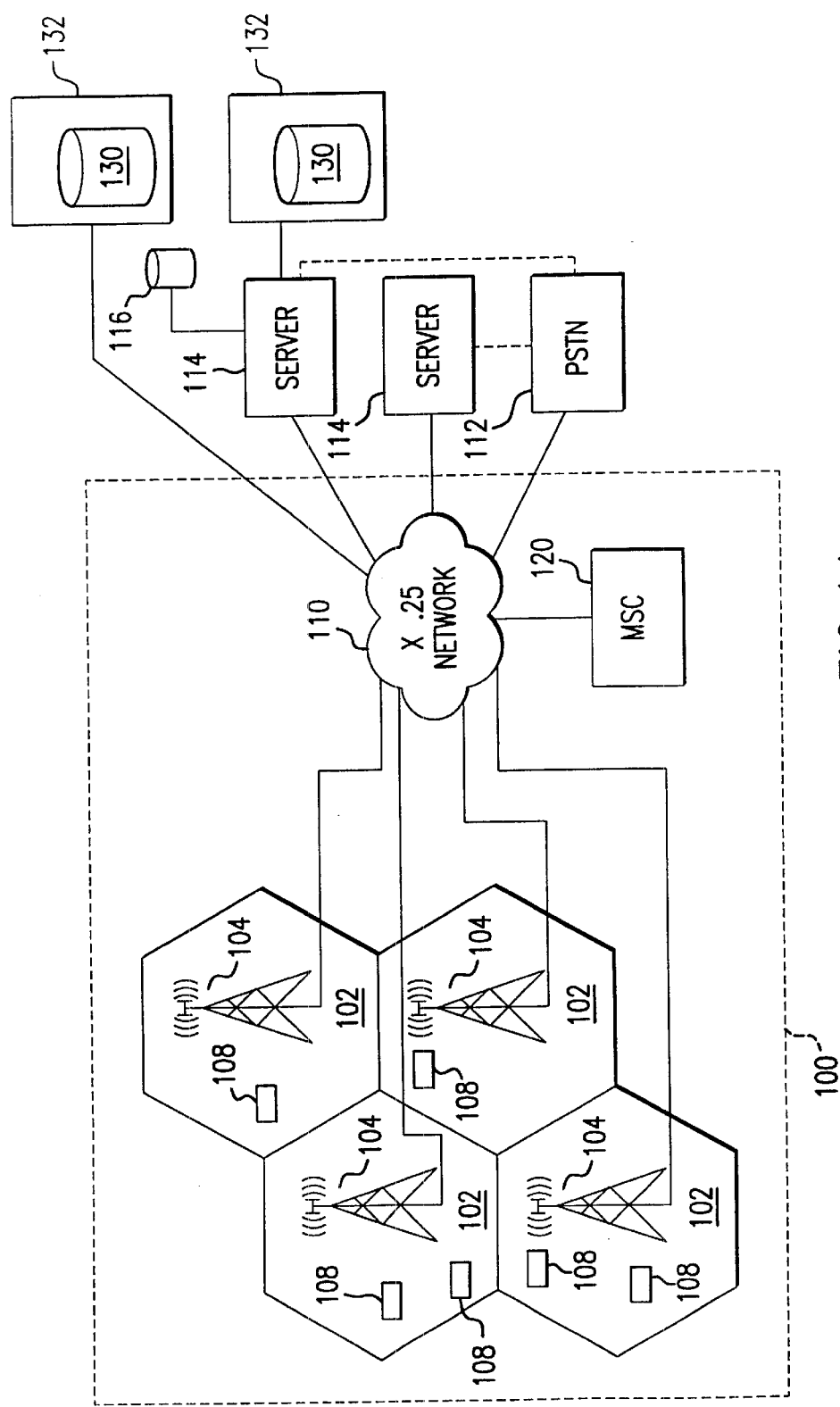
FIGS. 1A and 1B illustrate exemplary communications systems in which the present invention is useful.

An exemplary wireless communication system 100 in which the present invention is useful is illustrated in FIG. 1A. Communications system 100 includes a plurality of cell sites 102 each having a coverage area that is typically about 5 to 10 miles in diameter. A coverage area of one cell site often overlaps a portion of a coverage area of another cell site, which are illustrated for exemplary purposes by the hexagonal regions. Each cell site 102 includes an antenna 104 for transmitting and receiving messages to and from two-way wireless client devices 108 (e.g., a two-way pager, a wireless phone, a hand held computing device) that are located within a geographic coverage area of the cell site 102. Alternatively, separate antennas may be used for sending and receiving messages, as would be apparent to a person skilled in the relevant art. Each cell 102 is coupled to communications network 110, which can be, for example, an X.25 packet switched network. Communications network 110 may include, but is not limited to, land based links such as fiber optics or terrestrial microwave, and/or satellite based links, as would also be apparent to a person skilled in the relevant art.

Each cell site 102 is in communications with a message system center (MSC) 120 that includes a subscriber database (also referred to as a user database) that maintains records of all subscribers (also referred to as users) on the system, a unique identity sequence for the subscriber's client device, and an indication of the cell site from which the client device last sent a message (such as an acknowledgment message or a request message). Preferably, communications between each cell cite 102 and MSC 120 is accomplished through communications network 110. Alternatively, each cell site 102 can have a dedicated link to MSC 120.

Communications network 110 can be coupled to a public switched telephone network (PSTN) 112 so that a message can be sent to and from client device 108 via PSTN 112.

A message can also be sent from one client device 108 to another client device 108 using communications system 100.

In one embodiment, communications system 100 is the Bell South Wireless Data network (also known as the RAM Mobile Data network) or the ARDIS network, which are both well known two-way nationwide wireless packet data networks.

A client device (e.g., two-way wireless communications device) 108 typically identifies itself to MSC 120 by sending a registration or identification signal. Such signals include a data field including at least one unique identifier, such as a Mobile Identification Number (MIN) and/or Electronic Serial Number (ESN). A MIN, which can be reprogrammed, is analogous to a telephone number. An ESN is hard-coded and fixed such that it difficult, if not impossible to change. Some devices include both a MIN and an ESN. The client device used in an embodiment of the present invention, discussed in more detail below, only includes one unique identifier, known as a Mobile Access Number (MAN), which is similar to an ESN in that it is hard-coded and fixed. The identification signal sent by client device 108 can include one or more of the above discussed unique identifiers, or any other similar unique identifier. Such identification information can be periodically transmitted by client device 108 and/or included with other types of messages sent by client device 108. Such unique identifiers are also sent with each request sent by a client device 108.

An optional function of MSC 120 is to determine whether the unique identifier of a client device is valid. A received unique identifier, such as a unique identity sequence comprising a string of digitally represented alphanumeric characters, can be compared to a maintained database of unique identifiers (i.e., MINs, ESNs, MANs) to detect fraud.

MSC 120 can keep track of the approximate whereabouts of each client device 108 by keeping track of which cell site 102 a message, sent by a client device 108, originated. When MSC 120 is thus informed of the approximate whereabouts of each individual client device 108, it can later limit the number of cell sites 102 from which it transmits a message addressed to a particular client device 108. MSC 120 can even limit the transmission of a message to only one cell site 120 having a coverage area within which the particular client device 108 is believed to be located. The coverage area of a limited number of cell cites 102 (possibly only a single cell site or a last know site and its adjacent sites) shall be referred to as a targeted coverage area. Thus, the targeted area can be the area covered by a single cell site or a slightly larger area that is also covered by a few adjacent cell sites. This limited or "targetted" transmission is much more efficient than broadcast-type transmission where a message is transmitted from every cell site, regardless of a location of a client device 108 to which the message is addressed.

Servers 114 (typically controlled by a service provider) are supported by communications system 100. That is, communications system 100 provides for message delivery between a server 114 and one or more client devices 108. Servers 114 can communicate directly with client devices 108 or indirectly with client devices 108 via communications network 110. Alternatively, servers 114 can communicate with communications network 110 through PSTN 112. In one embodiment, a server 114 provides information to a client device 108 upon receiving a request from the client device 108. Additionally, servers 114 can initiate the sending of information (e.g., unsolicited information) to a client device 108. This can be done periodically or upon a triggering event. Additional details about the types of services and the information provided by services providers 114 are discussed below.

Figure 1B:
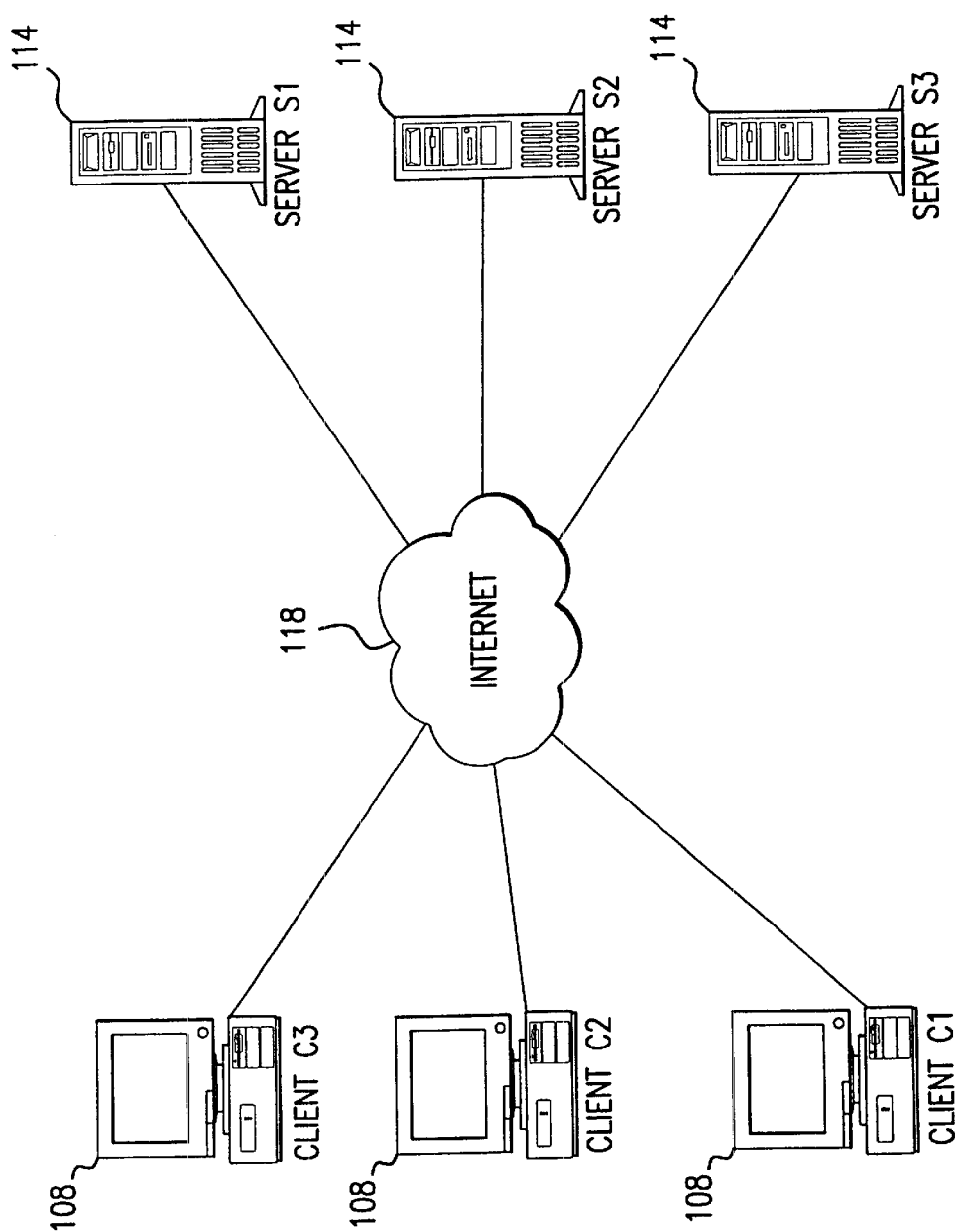

The present invention is also useful in data networks such as a local area network (LAN), a home area network (HAN), and a wide area network (WAN). For example, the present invention is useful in the largest present day WAN, known as the Internet, and in smaller WANs. The Internet is a world-wide set of interconnected computer networks that can be used to access a growing amount and variety of information electronically. One method of accessing information on the Internet is known as the World Wide Web (www, or the "web"). The web is a distributed, hypermedia system, and functions as a client-server based information presentation system. Information that is intended to be accessible over the web is generally stored in the form of "pages" on servers (e.g., general purpose computers). Users can access a web site using general-purpose computers, wireless hand held computing devices, Internet capable wireless phones (e.g., a Wireless Application Protocol (WAP) Internet enabled telephone), and the like, referred to as clients, by specifying the uniform resource locator (URL) of the site. FIG. 1B is a network block diagram showing a plurality of clients 108 and servers 114 connected to the Internet 118.

When a client sends a request to a server the request specifies, among other things, a destination address (e.g., a URL) and a source address that can be used to identify a user. A part of the URL known as the Domain Name is passed to a domain server (DNS) to be translated to a network address. The network address specifies the Internet protocol (IP) address of the intended server. The client request is passed to the server having the network address.

Servers 114 maintain or otherwise have access to local or remote databases that store and/or provide various types of data. For example, referring to FIG. 1A, remote databases 130 are maintained by data sources 132. FIG. 1A also shows a local database 116 that is maintained by server 114. Servers 114 can communicate with data sources 132 through dedicated links or through communications network 110, for example. The type and number of databases, and the form of communication of data between the servers 114 and the databases, is implementation specific.

The invention covers the ability of a server system to provide information to client devices via a wireless communications system, which typically has a plurality of cell sites that are coupled to a communications network. The invention also covers the ability of a server system to provide information to client devices via a wired communications system, or via a communications system consisting of a combination of wired and wireless links. The functions performed by the server system can comprise software running on one or more general purpose computers or on telecommunications-specific hardware. Alternatively, the combination of the software and hardware to accomplish the functions of the present invention can be conceptualized as a union of server controllers that each perform a discrete task, such as: sending a request from a client device in response to user input at the client device; receiving the request at a server over the communications network; identifying a user based on the request; determining a response based on the request; sending the response to the client device of the user, or the like. One, two, or more of these discrete tasks can be performed by a single server controller. That is, the tasks performed by a first server controller and a second server controller can be performed by a single server controller and still be within the spirit and scope of the present invention. Alternatively, the discrete tasks can be performed by any number of server controllers. A further description of exemplary software and hardware controllers is provided below.

III. Exemplary Client Devices

Figure 2A:
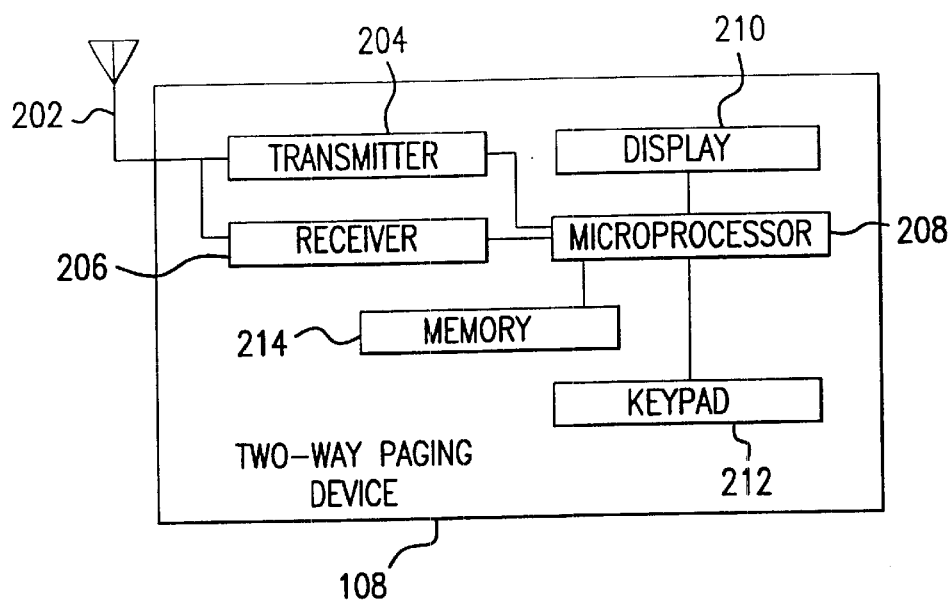
FIG. 2A illustrates an exemplary two-way communications client device for use with the present invention.

An exemplary two-way wireless communications client device 108 is illustrated in FIG. 2A. Client device 108 includes an antenna 202, a transmitter 204, a receiver 206, a microprocessor 208, a display 210 and a keypad 212. Transmitter 204 is controlled by microprocessor 208 and transmits messages using antenna 202. Messages received from a transmitter of the communications system 100 are received through antenna 202 or a separate antenna (not shown). The received messages are routed from antenna 202 to receiver 206 and processed by microprocessor 208, for example. Display 210 can be a liquid crystal display and is used for displaying, to a user (also referred to as subscriber) of client device 108, information received via communications system 100. Display 210 can also display lists and/or menus from which a subscriber can make selections and perform various functions. Other methods of presenting the received information, such as aurally through a speaker or through another type of display, are not precluded. Keypad 212 can include as few as one button, but may also include an entire alphanumeric keypad, touch pad, or can be integrated with a display, such as a touch-screen display. Client device 108 also includes a memory 214 that can store software and/or data. Microprocessor 208 can write to and read from memory 214.

In one embodiment, client device 108 is an Inter@ctive™ Pager 950 manufactured by Research In Motion (RIM), Limited, of Waterloo, Ontario, Canada. The RIM Inter@ctive pager (RIM pager) is a commercially available device that provides for two-way wireless communications.

Figure 2B:
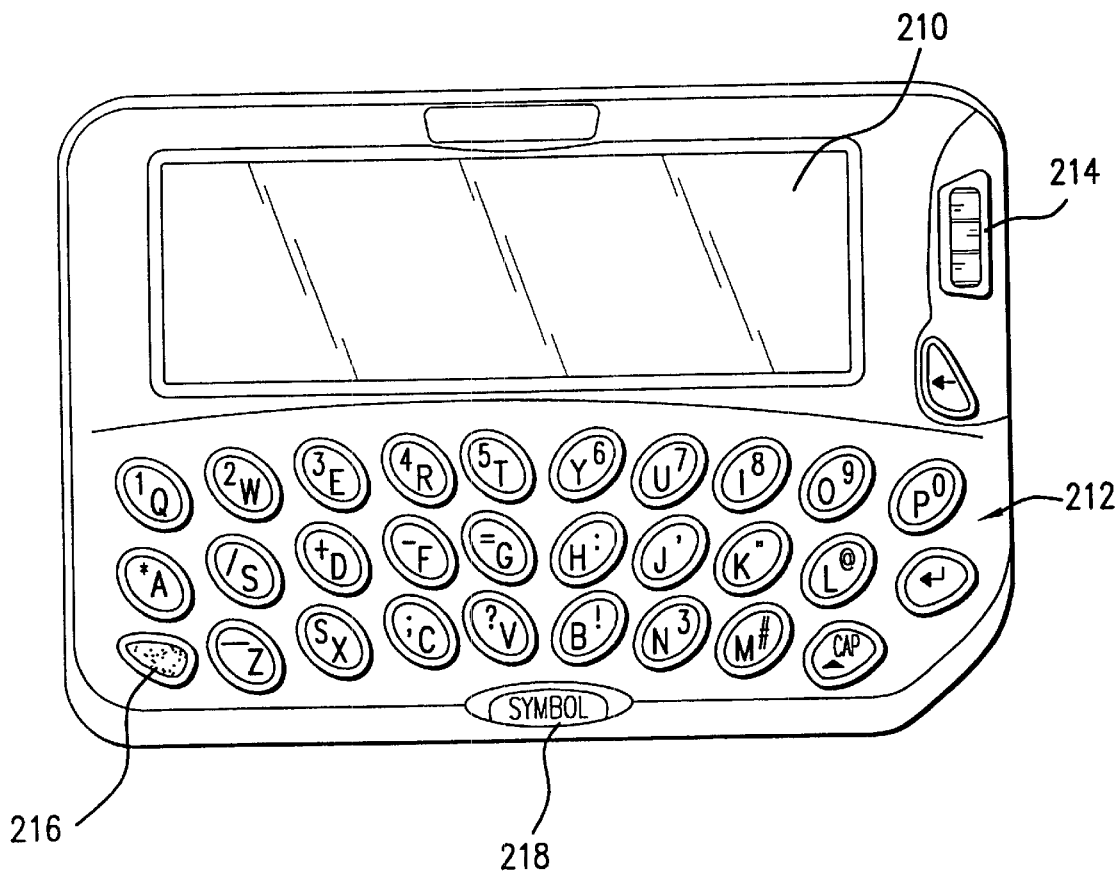
FIG. 2B is an illustration of a paging device manufactured by Research In Motion (RIM), Limited, of Waterloo, Ontario, Canada.

The RIM pager, shown in FIG. 2B, includes a 31-key keypad 212, roller wheel 214 that is similar to a mouse, and screen display 210 with 8 lines of text by approximately 28 characters per line. The RIM page also includes a built-in internal radio modem for two-way wireless communications over a cellular network such as the BellSouth network. In another embodiment, client device 108 is a Palm Pilot™ computing device, manufacture by 3Com Corporation, of Santa Clara, Calif. Client device 108 can also be a wireless communication device such as, but not limited to, a wireless telephone, a data transceiver, and a paging receiver. Client device 108 can be fixed, portable, or mobile, such as a mobile telephone. Of course the use of other two-way communications devices is within the spirit and scope of the present invention.

For some embodiments, client device 108 can be a personal computer that, for example, communicates with servers 114 via a network such as the Internet 118. Client device 108 can also be a personal computing device that wirelessly accesses the Internet. Those of ordinary skill in the art will envision other implementations of client device 108 and appreciate that they are encompassed by the present invention.

IV. Embodiments of the Invention

A.1. Client-Server Architecture

The system described in connection with FIGS. 1A, 1B, 2A and 2B provides a plurality of ever expanding information services to a user of client device 108. In an example application, a user requests stock prices from server 114, using client device 108. In response, server 114 transmits the requested stock prices to client device 108. Client device 108 then displays the stock prices to the user on display 210.

Figure 3:
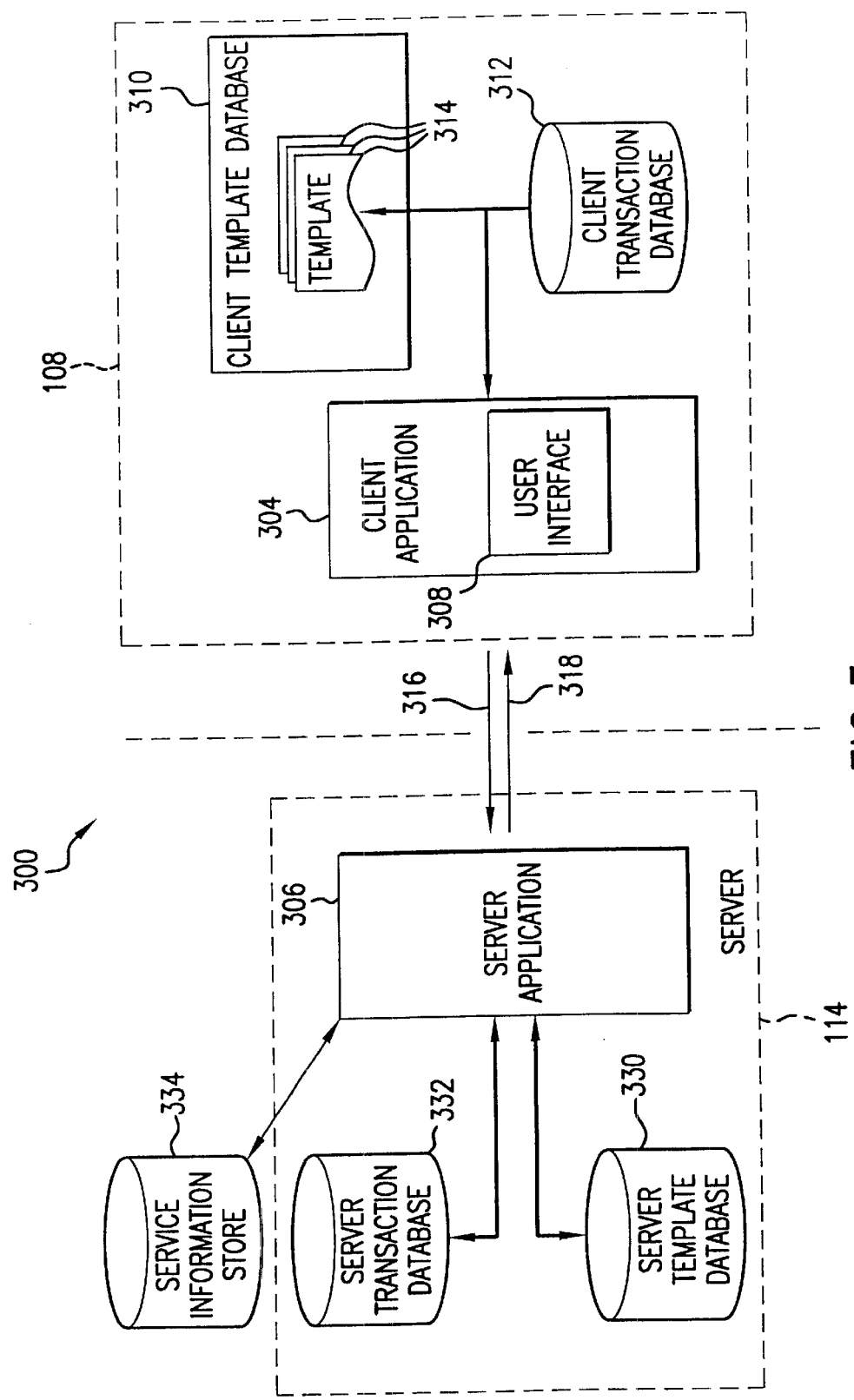
FIG. 3 is an illustration of a logical architecture corresponding to the communication system of FIGS. 1A and 1B and the communications device of FIG. 2A.

A logical architecture 300 of an embodiment of the present invention is depicted in FIG. 3. Logical architecture 300 corresponds to the system of FIGS. 1A and 1B. Logical architecture 300 includes a client application 304 residing in client device 108, and a server application 306 residing in server 114. Client application 304 (also referred to as client 304) and server application 306 are, for example, computer programs respectively supported by computer controllers and memories of client device 108 and server 114.

For example, server 114 (also referred to as server controller 114) comprises the hardware and/or software required to accomplish specific functions of the present invention. Server 114 can be conceptualized as a union of servers that each perform a discrete task. One, two, or more of these discrete tasks can be performed by a single server 114. That is, the tasks performed by a first server 114 and a second server 114 can be performed by a single server 114 and still be within the spirit and scope of the present invention. Alternatively, the discrete tasks can be performed by any number of servers 114. That is, the task performed by a single server 114 can be performed by a plurality of servers.

Similarly, client 304 (also referred to as client controller 304) comprises the hardware and/or software required to accomplish specific functions of the present invention. Client 304 can be conceptualized as a union of clients that each perform a discrete task. One, two, or more of these discrete tasks can be performed by a single client 304. That is, the tasks performed by a first client 304 and a second client 304 can be performed by a single client 304 and still be within the spirit and scope of the present invention. Alternatively, the discrete tasks can be performed by any number of clients 304. That is, the task performed by a single client 304 can be performed by a plurality of clients.

A.2. Client Overview

Client 304 includes a user interface 308 at client device 108 for allowing a user to interact with one or more information services supported by the system of the present invention. User interface 308 displays formatted information pages on display 210 and permits the user to navigate between such display pages. User interface 308 also provides the user with a mechanism to enter requests and/or commands using, for example, keypad 212 (see FIG. 2B).

Client 304 interfaces with a client template database 310 and an client transaction database 312 stored in a memory of client device 108. Client template database 310 includes a plurality of individual templates 314, typically associated with one or more information services provided by the system of the present invention. In the present invention, client 304 and user interface 308 are defined and configured, and can be updated, in accordance with individual templates 314. As will be further described below, each template 314 is typically associated with a display page, and uniquely defines the type of information and a layout or format of information presented to the user on the display page. Each template 314 can also define a set of available actions a user can take when viewing an associated display page, thereby allowing, for example, the user to request information from the display page and to navigate between display pages.

Client device 108 can transmit information request message 316 to server 114 when appropriate. Client device 108 also receives response message 318 and can stores information in the response message in client transaction database 312, so as to preserve the information for later retrieval. Also, user interface 308 can display requested information to the user.

A.3. Server and Server Database Overview

Server 114 can communicate with a plurality of client devices 108. Server 114 distributes requested information to client devices 108, and maintains configuration control over the client devices. To perform such tasks, server 114 interfaces with a plurality of information stores, including a server template database 330, a server transaction database 332, and an exemplary services information store 334.

Services information store 334 includes real-time data from data sources 132 (not shown in FIG. 3; see FIG. 1A). Services information store 334 can include data relating to finance and stocks, sports, weather, airline schedules, and the like. Services information store 334 can be a local database 116 or a remote database 130. When server 114 receives information request 316 from client device 108, server 114 retrieves the requested information from information store 334, and transmits the information to client device 108 using information response message 318.

Server transaction database 332 includes tables mapping individual client device unique identifiers (for example, MANs, MINs, or ESNs) to authorized services and associated templates. Server 114 uses such mapping tables to validate/authorize client requests. Server 114 maintains transaction event data for past and on-going transactions between server 114 and clients 304 in server transaction database 332. Such data is used to track and control the various transactions in the system of the present invention and to build transaction history tables for each of the client devices 108.

Server template database 330 includes the latest or most current versions of all of the available templates in the system of the present invention. Server template database 330 also includes tables mapping individual client device unique identifiers to the most current template versions authorized for client devices 108 associated with the unique identifiers. As new services, features and options are added to the system of the present invention, new templates are stored in server template database 330 and/or existing stored templates are updated, to reflect the additions. Therefore, at any given time, it is possible a client device 108 includes an old version of a template, that is, an out-of-date template that requires updating. When server 114 receives information request message 316 from client device 108, server 114 determines whether the template (at client device 108) associated with the request message is the most current template (for example, an updated template). If the template is an old version, server 114 retrieves the most current template from server template database 330, and then transmits an appropriate template update, along with the requested information, to client device 108 using response message 318. In this manner, server 114 distributes the most current template versions to client devices 108 on a per access and an as needed basis. Thus, server 114 efficiently distributes template updates to client devices 108 to render new service features and options available to the users, and maintain configuration control over the clients. Further details regarding initially configuring and reconfiguring/updating a client device with templates are respectively provided in: U.S. pending patent application Ser. No. 09/523,170, entitled "System, Method and Apparatus for Initial Configuration of a Client Device"; and U.S. pending patent application Ser. No. 09/523,168, entitled "System, Method and Apparatus for Automatically and Dynamically Updating Options, Features, and/or Services Available to a Client Device", each of which was wholly incorporated by reference above.

B.1. Template Overview

In the present invention, the templates stored in client device 108 define a configuration of the client device. The configuration of client device 108 can determine the data services a user can access using client device 108, including various data service options and/or features. Also, the configuration can determine the way in which client device 108 interacts with the user to provide data services to the user. This can include, but is not limited to, the types of pages displayed to the user, the appearance of the display pages, the types and/or arrangements of information displayed on the pages, the navigable hierarchy of display pages presented to the user, the types and/or operations of actions the user can initiate when the user is presented with the display pages, the types of requests a user can enter via client device 108 and/or the content of client requests resulting from such entered user requests. The configuration of client device 108 can also determine how client device 108 responds to various user requests.

Figure 4A:
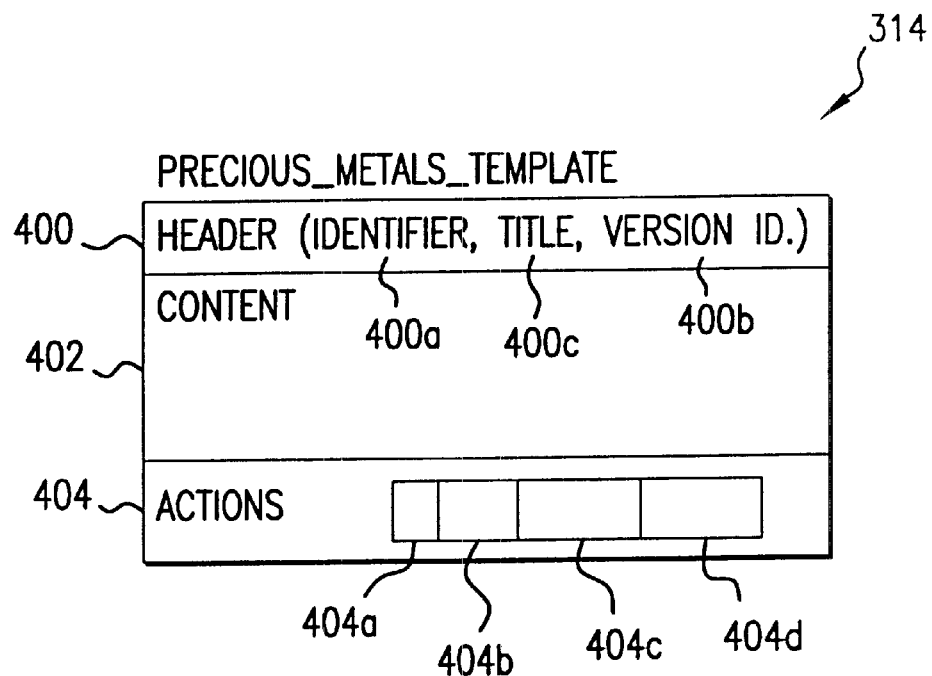
FIG. 4A is an illustration at a high level of an embodiment of a template used in the logical architecture of FIG. 3.

FIG. 4A is an illustration at a high level of an embodiment of template 314.

Template 314 includes a template header 400 having a template identifier 400a, a template version identifier or number 400b, and an optional template title 400c. Template 314 also includes a content portion 402 and an action portion 404. Content portion 402 includes definitions or descriptors (such as textual, symbolic and/or graphical descriptors) that define a layout and appearance of an associated display page on display 210. In other words, content portion 402 specifies an arrangement of information fields on the associated display page.

On the other hand, action portion 404 includes definitions (such as textual, symbolic, and/or graphical descriptors) specifying a set of actions a user can take with respect to the associated display page. For instance, action portion 404 can include: menu action definitions 404a, such as menu pull-down actions and scrollwheel shortcuts; keyboard action definitions 404b, such as keyboard shortcuts (e.g., press "W" for weather service requests); branching action definitions 404c, allowing the user to branch from the current template and display page to a next template and display page linked with the current template; and external references 404d, such as URLs. Such actions are available to the user at the display page associated with template 314.

Content portion 402 is now further described. Content portion 402 typically includes text (for example, header or title information, and field labels) and variable descriptors (for example, stock quote information). Content portion 402 defines a format for the variable information and text within the display page. Content portion 402 can also include references to tables and graphical entities stored in the client device memory.

Figure 4B:
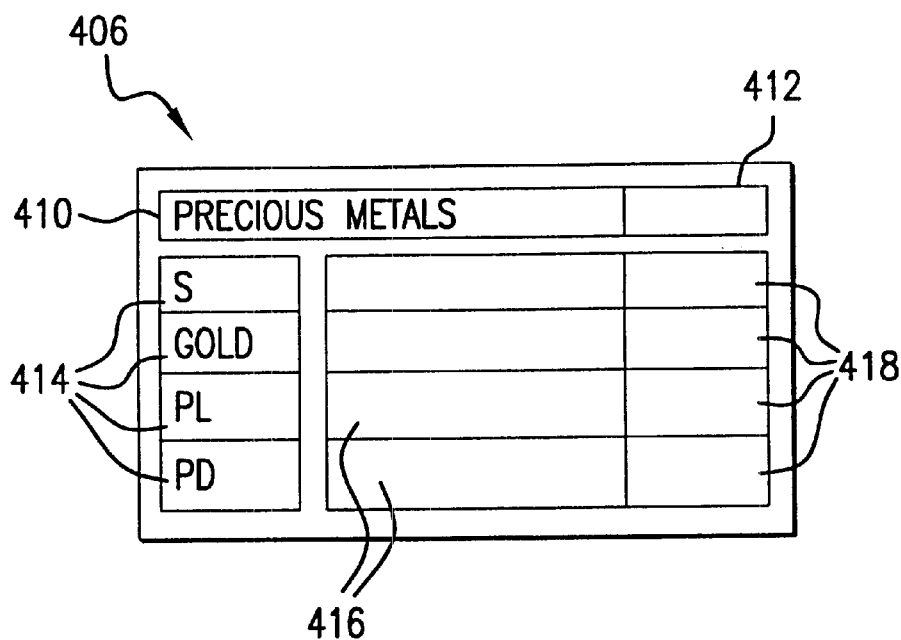
FIG. 4B is a diagrammatic representation of an exemplary content portion of a template used in the logical architecture of FIG. 3.

A diagrammatic representation of the content portion of an exemplary template 406 is depicted in FIG. 4B. The content portion of template 406 includes the following definitions:

a title 410 for displaying the text "PRECIOUS METALS";

a field 412 for displaying current time;

a plurality of information field identifiers or labels 414 arranged in a column; and a first set of information fields 416 for displaying variable information (such as stock prices) and a second set of variable fields 418 for displaying further variable information corresponding to the information field identifiers.

Template 406 is incomplete because none of the information fields are populated with the specified variable information. When client device 108 receives requested information corresponding to template 406, client device 108 populates an instance of template 406 with the requested information, thereby creating a completed template. User interface 308 displays the completed template to the user as a display page. A display page/completed template 420 corresponding to template 406, is depicted in FIG. 4C. In display page 420, field 412, fields 416, and fields 418 are respectively populated with current time, hi/low stock prices, and stock price deviations.

In the present invention, each template can incorporate a unique set of actions available to the user when the template is displayed as a display page, as mentioned above. In other words, actions can vary from template to template and page to page in the present invention. Template actions are further described below.

FIG. 4D is an illustration of a list of exemplary definitions or descriptors that define template 406 (FIG. 4B), and thus display page 420 (FIG. 4C), as the template can be stored in either client or server template databases 310 or 330. The illustrated list of definitions correspond to a data service for precious metal prices. In header 400, "NT", "VERSION", and "TI" respectively specify the template name "temp1", version "1.1", and title "PRECIOUS METALS".

Content portion 402 (corresponding to labels 414, and fields 416 and 418 of FIG. 4B) includes a plurality of content definitions 436 for metal pricing information. A spaced pair of percent symbols (%) delimits each information field. For example, the definition "<SILVER%0:11%%1:6%>" causes two variable fields of information to be displayed after the text "SILVER" on the display of client device 108. Action portion 404 includes exemplary action definitions 442 and 444. The actions defined by action definitions 442 and 444 are available to the user when the display page associated with the template (for example, display page 420 of FIG. 4C) is being displayed.

Action definition 442 defines a menu choice "refresh" in a list of displayed menu items. When "refresh" is selected in one embodiment, client device 108 retrieves the most recently received information relating to template temp, from client transaction database 312, and refreshes the display with the retrieved data. In another embodiment, selecting "refresh" causes client device 108 to first update the display with information retrieved form client transaction database 312 as just described, and then transmit an information request for new information to refresh the displayed information. In still another embodiment, the first step is omitted from the just described two-step embodiment.

Action definition 444 defines a shortcut key as "SP", the "space bar" key (also referred to as the "symbol key") on keypad 212, which when pressed, causes a branch to a predetermined home template or page called $temp_{home}$. Client device 108 then displays the home page associated with $temp_{home}$.

The templates of the present invention provide a powerful and convenient mechanism for configuring, reconfiguring, and updating client device 108 and user interface 308. As the system of the present invention adds new services and/or expands existing service options and features, correspondingly new and/or updated templates are automatically distributed to and stored in client devices 108. The new and/or updated templates correspondingly expand the service features and options available to the user so that the user can access the new and expanded services.

Figure 5:
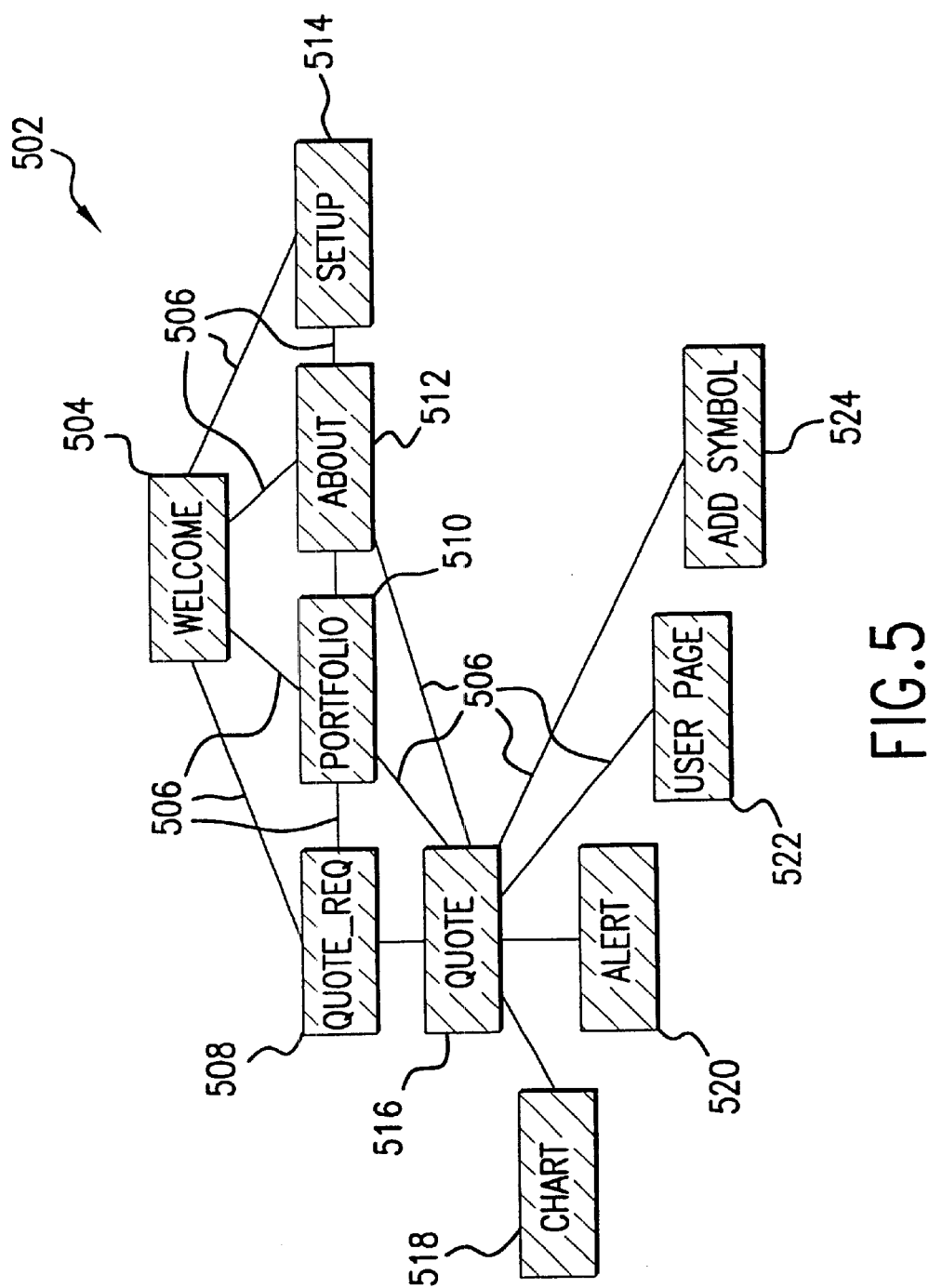
FIG. 5 is an illustration of an exemplary hierarchy of display pages.

In the present invention, templates 314 stored in template data base 310, and the actions specified in each of the templates, define an interconnected hierarchy of user navigable display pages at client device 108. FIG. 5 is an illustration of an exemplary hierarchy of display pages 502. In the example hierarchy, user interface 308 displays a home or welcome page 504 to the user when client device 108 is first powered-on. Home page 504 is a service starting page. Using actions, represented by connectors 506, defined for the home page by the associated home page template, the user can branch to a quote request page 508, a portfolio page 510, an informative "about" page 512, and a set-up page 514. The user can navigate between the aforementioned pages and a quote display page 516, a chart page 518, a user alert page 520, user page 522 and an add symbol page 524.

Figure 6A:
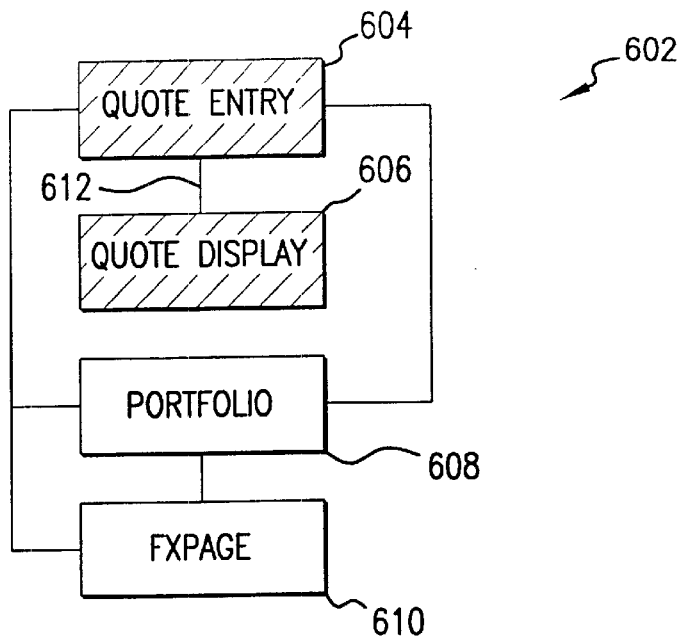
FIG. 6A is an illustration of an exemplary user interface including linked pages defined by a hierarchy of templates, before a template update.

Templates and the actions defined thereby advantageously provide a convenient mechanism for altering user interface 308 and associated applications in accordance with expanding services, without changing the underlying user interface or client computer programs. An exemplary update to user interface 308 is now described with reference to FIGS. 6A and 6B. With reference to FIG. 6A, a user interface 602 is defined by a quote entry page 604, a quote display page 606, a portfolio page 608 and an FxAlert page 610 (e.g., for current precious metal prices) linked together by actions 612.

Figure 6B:
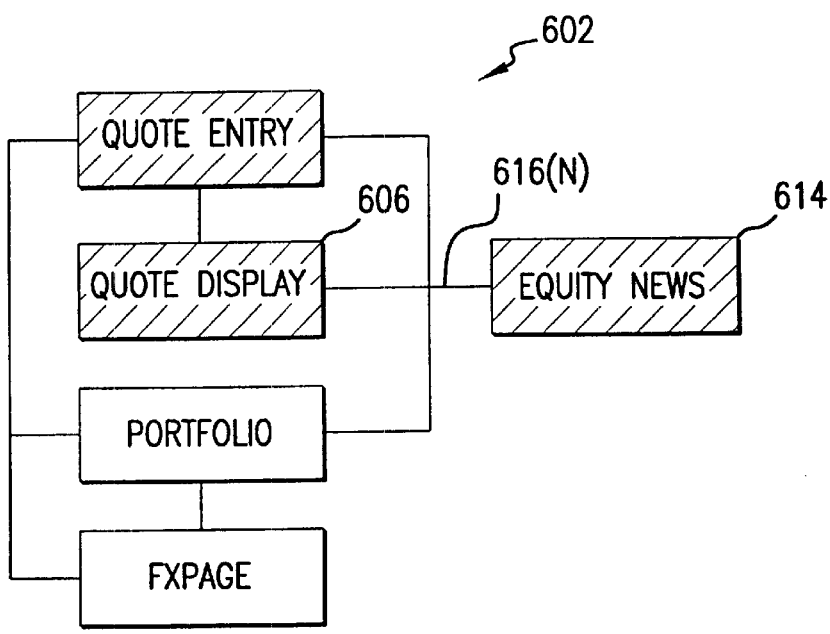
FIG. 6B is an illustration of the exemplary user interface of FIG. 6B, after the template update.

With reference to FIG. 6B, to add a new service or user capability, for example, the ability of obtaining the latest news for a particular stock, a new .template, defining a new page 614 called "Equity News," can be composed for accessing such latest new stock information. New page/template 614 can be linked to and thus only accessible from quote display page 606, assuming new page 614 should be accessible only after a particular stock quote is displayed on quote display page 606. To effect such a link, an action 616 can be added to quote display page (template) 606. For example, the added action 616 can define a branch key N, which when pressed, causes a branch from quote display page 606 to Equity News page 614 in accordance with the above assumption.

C.1. Server Transaction Database

As described above in connection with FIG. 3, server 114 accesses server transaction database 330 to manage transactions with numerous clients 304. FIG. 7A is an illustration of an exemplary transaction table 700 stored in server transaction database 330. Exemplary table 700 includes a client identification column 702, a template identifier column 703, an optional template title column 704, a template version column 706, an index column 708, a date column 710, a time column 712, and a parameters column 714. Each row of client identification column 702 includes a unique identifier of a client device 108 (e.g., MAN, ESN, MIN). Each row of template identifier column 703 includes a unique identifier of a template (e.g., $temp_1$, $temp_2$, $temp_3$). Each row of template version column 706 specifies the version of the template in the corresponding row of column 703. Accordingly, entries in template version column 706 specify the version of a template (i.e., identified in column 703) that a specific client (i.e., identified in column 702) currently has stored in its client template database 310. Each row of index column 708 identifies the data type that is used to populate the corresponding template in column 703. The data included in parameters column 714 is the data that was sent to the corresponding client (in column 702) the last time server 114 provided that client with the data type of column 708. Each row of date column 710 and time column 712 specifies when server 114 last provided the client device of column 702 with the data included in parameters column 714.

C.2. Server Template Database

As described above in connection with FIG. 3, server 114 accesses server template database 330 to maintain configuration control over client devices 108. FIG. 7B is an illustration of an exemplary table 750 stored in server template database 330. Table 750 includes a column 754 listing the identifiers of current templates stored in database 330, a column 756 listing template version numbers for the identified templates, and a column 758 listing the definitions of the identified templates. Each row 760 corresponds to an identified template, for example, template temp,. In another embodiment, version column 756 is deleted since a template version can be determined from a template header included in the template definition.

C3. Client Transaction Database

FIG. 8 is an illustration of an exemplary table 800 stored in client transaction database 312 of client device 108. Table 800 is essentially the same as server transaction table 700 of FIG. 7A and discussed above, except that table 800 does not include a client identifier column (e.g., column 702). This is because client transaction database 312, and thus table 800, are specific to only one client device 108.

D.1. Information Request and Response Messages

Figure 9A:
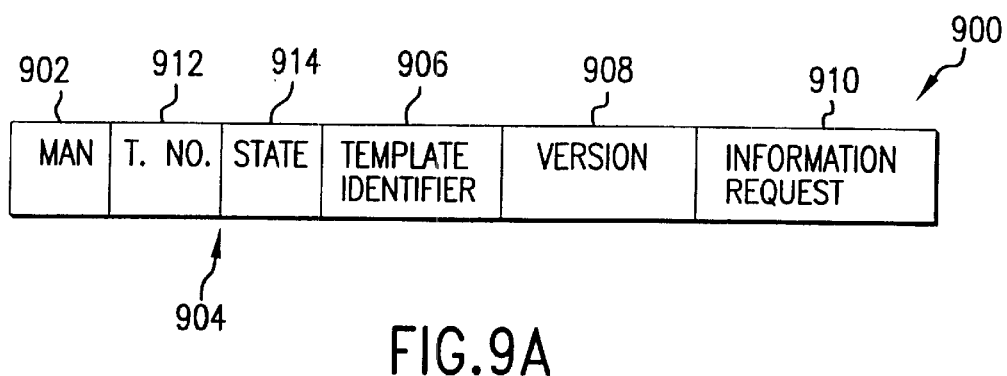
FIG. 9A is an illustration of an exemplary information request message transmitted by a client application used in the logical architecture of FIG. 3.

FIG. 9A is an illustration of an exemplary information request message 900 (corresponding to information request message 316 of FIG. 3) transmitted by client device 108. The information request message (e.g., 900) is also referred to as a client request, since it is initiated by client device 108. The fields of message 900 are arranged in accordance with an exemplary message format, and it is to be understood that message 900 can be arranged in other formats. Message 900 includes a client device identifier (such as a MAN) 902, transaction information 904 used by client device 108 and server 114 to track the current transaction, a template identifier or name 906, a template version identifier 908 identifying the version of the named template stored in template database 310, and a specific information request 910.

In one embodiment, transaction information 904 includes a transaction number 912 and a client state 914. Client 108 tracks each request using transaction number 912, which only client 108 can increment. Client state number 914 specifies the last successfully received update for the template identified by template identifier 906. In one embodiment, client 108 can store transaction number 912 and client state number 914 in, and retrieve transaction number 912 and client state number 914 from, additional columns (not shown) of server transaction database table 700. Use of transaction number 912 and client state number 914 are discussed below.

Client device 108 increments transaction number 912 every time it sends a client request to server 114. Only client device 108 can increment transaction number 912. However, client device 108 never increments client state number 914. Rather, server 114 increments client state number 914 when it sends a server response to client device 108.

If client device 108 issues multiple client requests (e.g., multiple requests for stock quotes AAPL, MSFT, GE, INTC, etc.), each request (e.g., 900) includes a transaction number 914. Server 114 responds to each request individually and echoes back the appropriate transaction number 914 in each server response (e.g., 920). Each server response received by client device 108 is stored in client transaction database 310. Additionally, in one embodiment, a display page associated with the server response to the last (i.e., in time) client request is displayed to the user.

Client state 914 is used by server 114 to determine the last successfully received (by client device 108) server response to a particular client request. This is important because client device 108 may fail to receive a server response sent by server 114. Thus, server 114 should save the last sent server response in, for example, a suspense file. Only when sever 114 receives a new client request (i.e., for the same information) with the same state number does it write the data of the last server response (which was stored in the suspense file) to server transaction database 332. For example, server 114 may receive a "state 6" client request and return a new "state 7" server response to client device 108. If client device 108 never receives the server response with "state 7", then the next time client device 108 makes the same client request it will again be a "state 6" client request. In this manner, server 114 will know that client device 108 never received the "state 7" server response. This enables server 114 to use old "state 6" data (rather than the data last sent to client device 108, that is associated with "state 7") when performing a comparison of old data to new data to thereby produce a server response.

In one embodiment, either client device 108 or server 114 can reset client state 914 to zero when a server response includes a full update (as opposed to a server response that only includes changes).

Figure 9B:
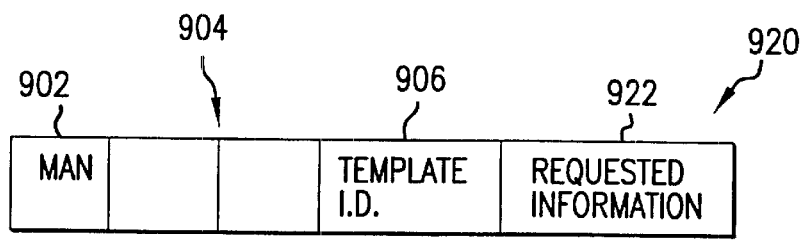
FIG. 9B is an illustration of an exemplary information response message transmitted by a server application used in the logical architecture of FIG. 3.

FIG. 9B is an illustration of an exemplary information response message 920 (corresponding to information response message 318) transmitted by server 114. The information response message (e.g., 920) is also referred to as a server response, since it is initiated by server 114. Message 920 (also referred to as server response 920) includes requested information 922, provided in response to specific information request 910 of information request message 900.

Another exemplary information response message (not shown) includes template update information to update a template in client device 108.

E.1. Requesting Information - Client

Figure 10:
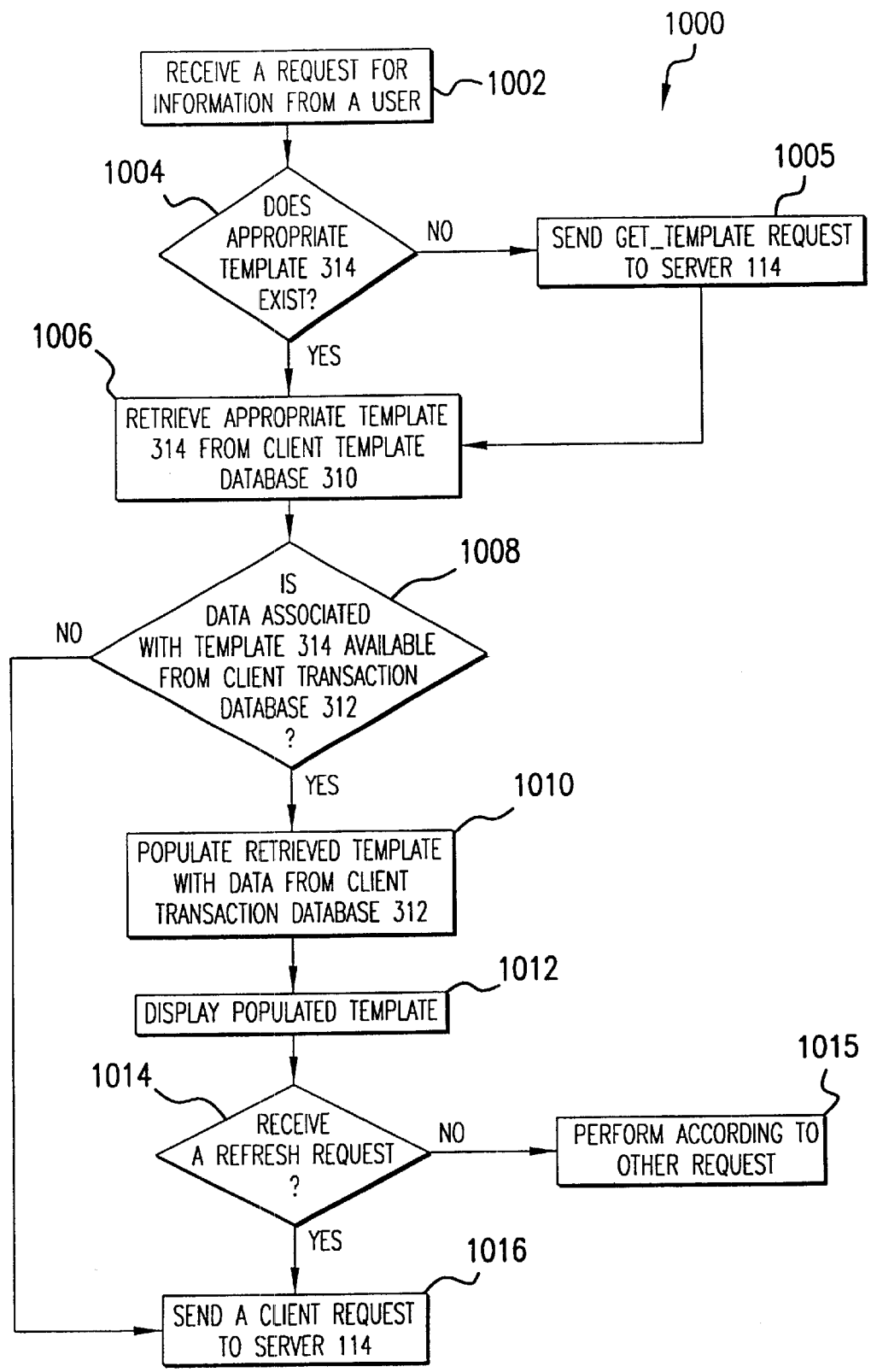
FIG. 10 is a flow chart of an exemplary method of requesting information at a client in the logical architecture of FIG. 3, according to an embodiment of the present invention.

Exemplary methods of requesting and responding to information requests are now described. FIG. 10 represents a series of method steps 1000 performed by client device 108 in response to a request for information from a user. The method begins at a step 1002 when the user of client device 108 issues a request for information from a displayed page, via user interface 308.

At a next step 1004, client device 108 queries client template database 310 to determine whether an appropriate template 314 associated with the request is locally available. If client device 108 determines that the appropriate template is not locally available (i.e., if the answer to step 1004 is NO), then, at a step 1005, client device 108 sends a get_template command to server 114. Further details of the get_template command and step 1005 are discussed in U.S. pending patent application Ser. No. (09/523,168), entitled "System, Method and Apparatus for Automatically and Dynamically Updating Options, Features, and/or Services Available to a Client Device", incorporated herein by reference above. If the appropriate template is locally available, then at a step 1006, client device 108 retrieves the appropriate template from client template database 310.

If the appropriate template is locally available, then at a step 1006, the appropriate template is retrieved from client template database 310. At a next step 1008, there is a determination whether data associated with the appropriate template is available from client transaction database 312. If the answer to step 1008 is YES, then flow continues to a step 1010, where the template is populated with data from client transaction database 312. The data retrieved from client transaction database 312 is the data last received from server 114 to populate the retrieved template (e.g., data from an earlier transaction). If the answer to step 1008 is NO, then flow jumps directly to a step 1016, which is discussed below.

In one embodiment, after step 1010, in a step 1012, the populated template is displayed (i.e., an associated page) on display 210 of client device 108. Preferably a status (e.g., date and time) of the displayed information is also displayed. Accordingly, the appropriate template preferably includes a status field that can be populated with status data (e.g., date and time). The information displayed to the user can be stale, for example, the data can be days, hours, or seconds old, depending on when client 108 last received the information to populate the appropriate template.

If the user directs client device 108 to do something other than refresh the information (i.e., if the answer to step 1014 is NO), then client device 108 functions accordingly. For example, the user may initiate a branch action that causes client device 108 to display a different page.

At a decision step 1014, if the user requests that the information (i.e., that populates the template) be refreshed with the "new" information (i.e., if the answer to step 1014 is YES), client device 108 composes and transmits an appropriate information request message to server 114, at a step 1016. In one embodiment, a user can request refreshed information by pressing a predefined action key, such as the "enter" key or "space bar" key. An example request message 900 is described above in connection with FIG. 9A.

In an alternative embodiment, flow jumps directly from step 1008 to step 1016, such that client device 108 sends a request message to server 114 after client device 108 retrieves data from client transaction database 312. In another embodiment, flow jumps directly from step 1006 to step 1016, such that client device 108 sends a request message to server 114 after client 204 retrieves the appropriate template from client template database 310.

E.2. Responding to an Information Request-Server

Figure 11:
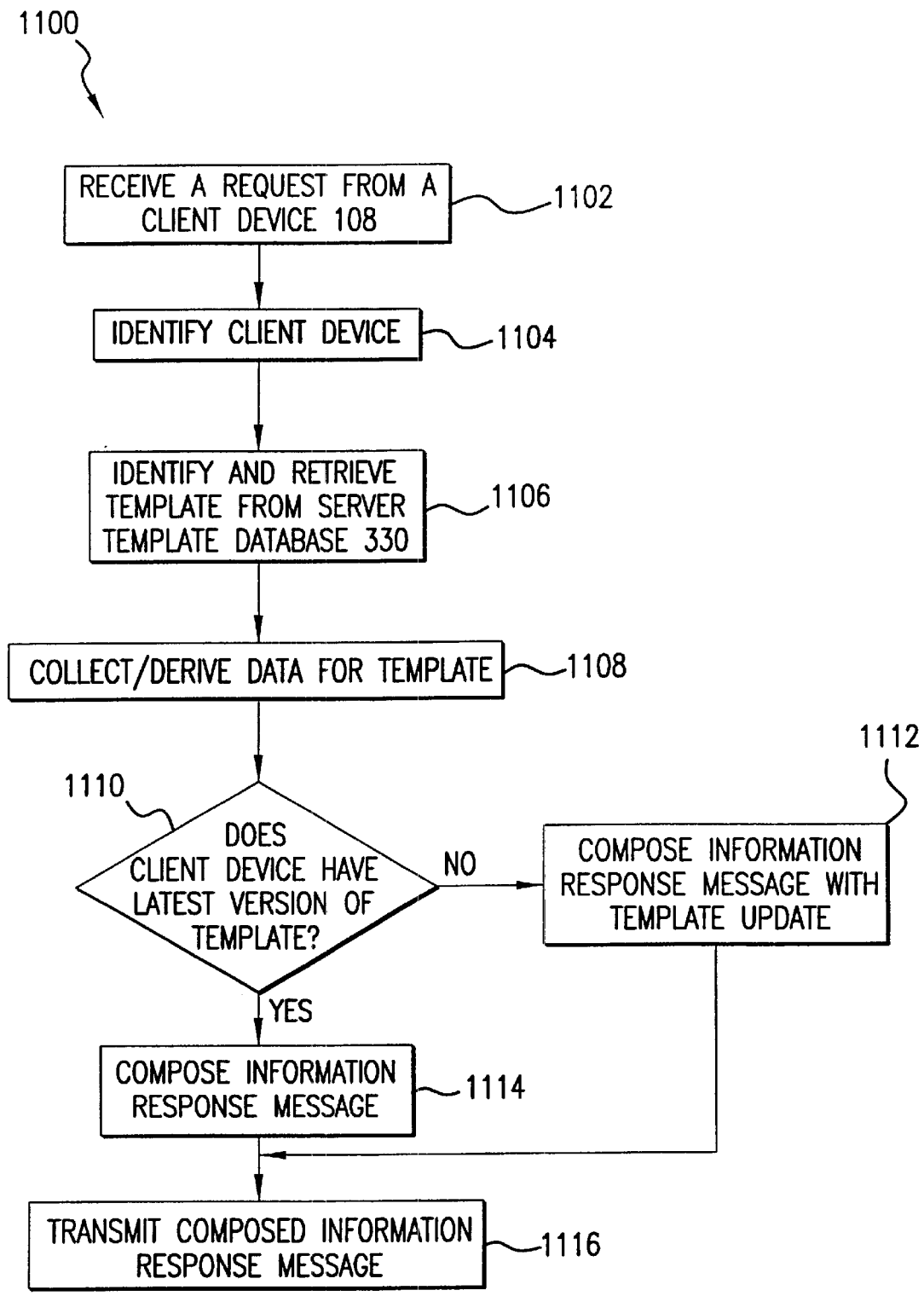
FIG. 11 is a flow chart of an exemplary method of responding to an information request of FIG. 10 at a server in the logical architecture of FIG. 3, according to an embodiment of the present invention.

FIG. 11 represents a series of method steps 1100 performed by server 114 in response to a request for information from client device 108. The process begins at a step 1102 when server 114 receives a request message (e.g., request 900) sent from client device 108. At a step 1104, server 114 identifies client device 108. This is accomplished using a unique identifier (e.g. 902) included in the request. In this example, server 114 recognizes that the client device 108 that sent the request message has a template for displaying the requested information, because the request (e.g., 900) includes a template identifier (e.g., 906). At this point, server 114 can also determine whether the specific information request is authorized for the requesting MAN.

At a next step 1106, server 114 retrieves the latest (i.e., most current or up-to-date) version of the identified template (e.g., the template identified by template identifier 906) from server template database 330. At a step 1108, server 114 retrieves/derives the requested information required to populate the data fields of the template that was retrieved at step 1106. For example, at step 1108, server 114 retrieves the requested information from information store 334 in accordance with the most current template definition.

In a step 1110, server 114 determines whether client 108 has the most current template. To make this determination, server 114 compares template version identifier 906 of the template named in information request message 900 against the version identifier for the same named template just retrieved from server template database 330 (e.g., in column 756 of table 750 of FIG. 7B) at step 1106.

If server 114 determines that the identified client device 108 does not have the latest version of the appropriate template (i.e., the answer to step 1110 is NO), then client device 108 has an "old" template that requires updating with a "new" template, namely, the template just retrieved from server template database 330. Accordingly, at a step 1112, server 114 composes an information response message including:

a) information retrieved from information store 334 at step 1108; and b) template update information from the "new" template.

Further details regarding step 1112 and template updating are discussed in U.S. pending patent application Ser. No. (09/523,168), entitled "System, Method and Apparatus for Automatically and Dynamically Updating Options, Features, and/or Services Available to a Client Device" incorporated herein by reference above.

On the other hand, if server 114 determines at step 1110 that client device 108 does not require a template update (i.e., the answer to step 1110 is YES), then server 114 composes an information response message using only the information retrieved from information store 334 (e.g., message 920), since a template update is unnecessary. At a next step 1116, server 114 transmits the composed information response message to client 108. For example, server 114 transmits response message 920 or 930 composed respectively at steps 1114 or 1112.

An advantage of the present invention is that if the client device 108 (to which the response message is being sent) has the most current template, then the composed and transmitted response message (e.g., message 920, composed in step 1114) only includes the information required to populate and thus refresh a template. This significantly reduces the size of the response message (or messages) that is transmitted from server 114 to client device 108. Minimizing the size of response messages reduces the cost and/or response time (also referred to as latency) for providing information services. For example, where a communications system provider charges on a volume basis, the less data transmitted means less cost to the user. Additionally, since latency is typically proportional to the amount of data being transmitted, the less data transmitted means lower latency. A further advantage is the reduction in a system transmission bandwidth, such that more users can be supported by the services of the system.

In one embodiment, the message that server 114 composes at step 1114 (and sends at step 1116) includes all the data necessary to populate a template.

In another embodiment, the message that server 114 composes at step 1114 (and sends at step 1116) includes the information that has changed since client device 108 last successfully received a server response (i.e., to populate the particular template) from server 114, but does not include the information that has not changed since server 114 last sent a successfully received server response message. Accordingly, an advantage of this embodiment is that the size of the response message (or messages) is further reduced.

Figure 12:
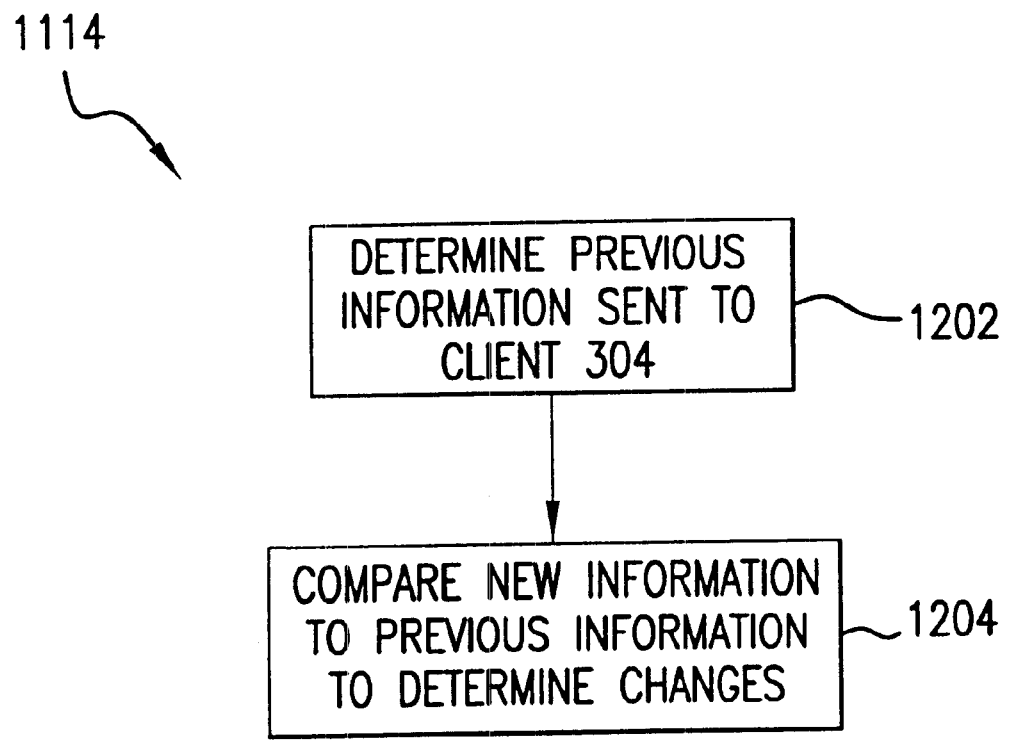
FIG. 12 is a flow chart of exemplary method steps expanding on the method of FIG. 11.

Further details of step 1114, according to an embodiment of the present invention, are discussed with reference to FIG. 12. In a step 1202, server 114 queries server transaction database 332 to determine the information, for the particular template, that client device 108 has stored in client transaction database 312. For example, server 114 searches table 700, of FIG. 7A, based on client identifier 902 and template identifier 906 to determine what information was last sent to client device 108 for the identified template.

In a step 1204, server 114 then compares the information in each data field (i.e., the information retrieved in step 1108 of FIG. 11) against the record of what was last successfully received by client device 108 (i.e., determined in step 1202), to thereby determine the information that has changed (also referred to as the changed fields).

Figure 13:
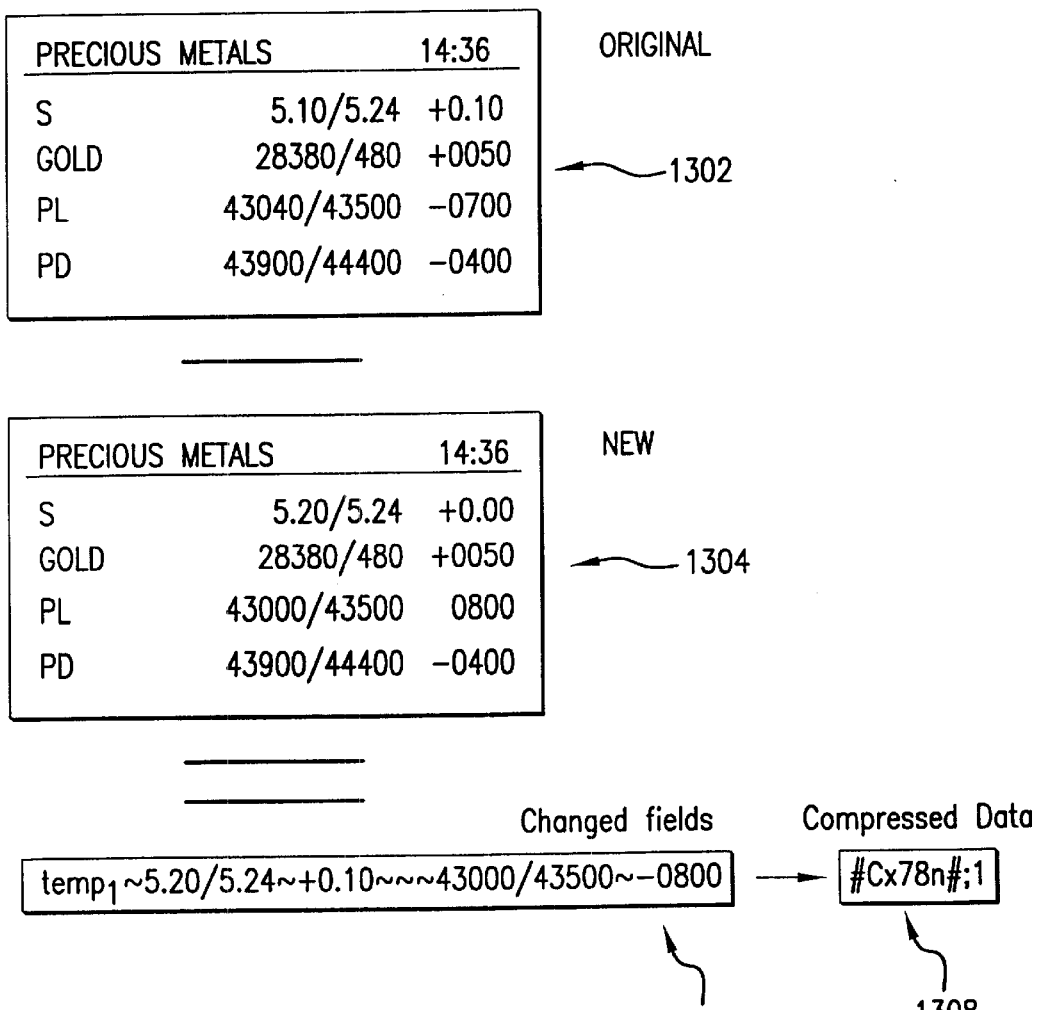
FIG. 13 is a illustration of exemplary display pages at a client device before and after receipt of an information response at the client device.

Steps 1202 and 1204 can be illustrated with reference to FIG. 13. An "old" page 1302 represents the information (populating a precious metals template) that client device 108 has stored in client transaction database 312 (i.e., at step 1202). Server 114 determines that client device 108 has such an "old" page of information using server transaction database 332. A "new" page 1304 represents up-to-date or current information (populating the same precious metals template) retrieved by server 114 at step 1108. A change definition 1306 represents a change in information between old page 1302 and new page 1304. Server 114 determines change definition 1306 by comparing the information in old page 1302 to the information in new page 1304. Server 114 compresses change definition 1306 using a data compression technique to produce a compressed change definition 1308, thereby further reducing the size of the response message.

In one embodiment, at step 1202, server 114 queries server transaction database 332, based also on client state number 912 (i.e., in addition to client identifier 902 and template identifier 906) to ensure that server 114 actually compares the up-to-date information (i.e., the information retrieved in step 1108) against what client device 108 actually has stored in its client transaction database 312. If this query is not based also on client state number 912, there is a possibility that server 114 will perform the comparison using information that was last sent to client device 108, but never received by client device 108.

Referring again to FIG. 11, after server 114 transmits the information response message (e.g., 900) in step 1116, client device 108 receives the response message. Client device 108 then updates client transaction database 312 with information from the response message. For example, client device 108 replaces a row of client transaction table 800 containing "old" information with "new" information received from the response message. In another example, if the response message only includes a change definition, then client device 108 only replaces those columns of a row of transaction table 800 specified in the change definition. Client device 108 can then refresh the current display page by retrieving the "new" information from client transaction database 312. For example, client device 108 can use the "new" information to populate the data field(s) of the template retrieved at step 1006.

An advantage of the present invention is realized when client device 108 sends one or more additional request messages to server 114 prior to receiving a response message(s) to one or more previous requests (i.e., back from server 114). This advantage is also present when client device 108 sends the first request message to a first server 114 and a second request message to a second (i.e., different) server 114. A series of exemplary method steps 1400 performed at client device 108 are now described to illustrate this advantage.

E.3. Multiple Consecutive Client Requests and Server Responses

Figure 14:
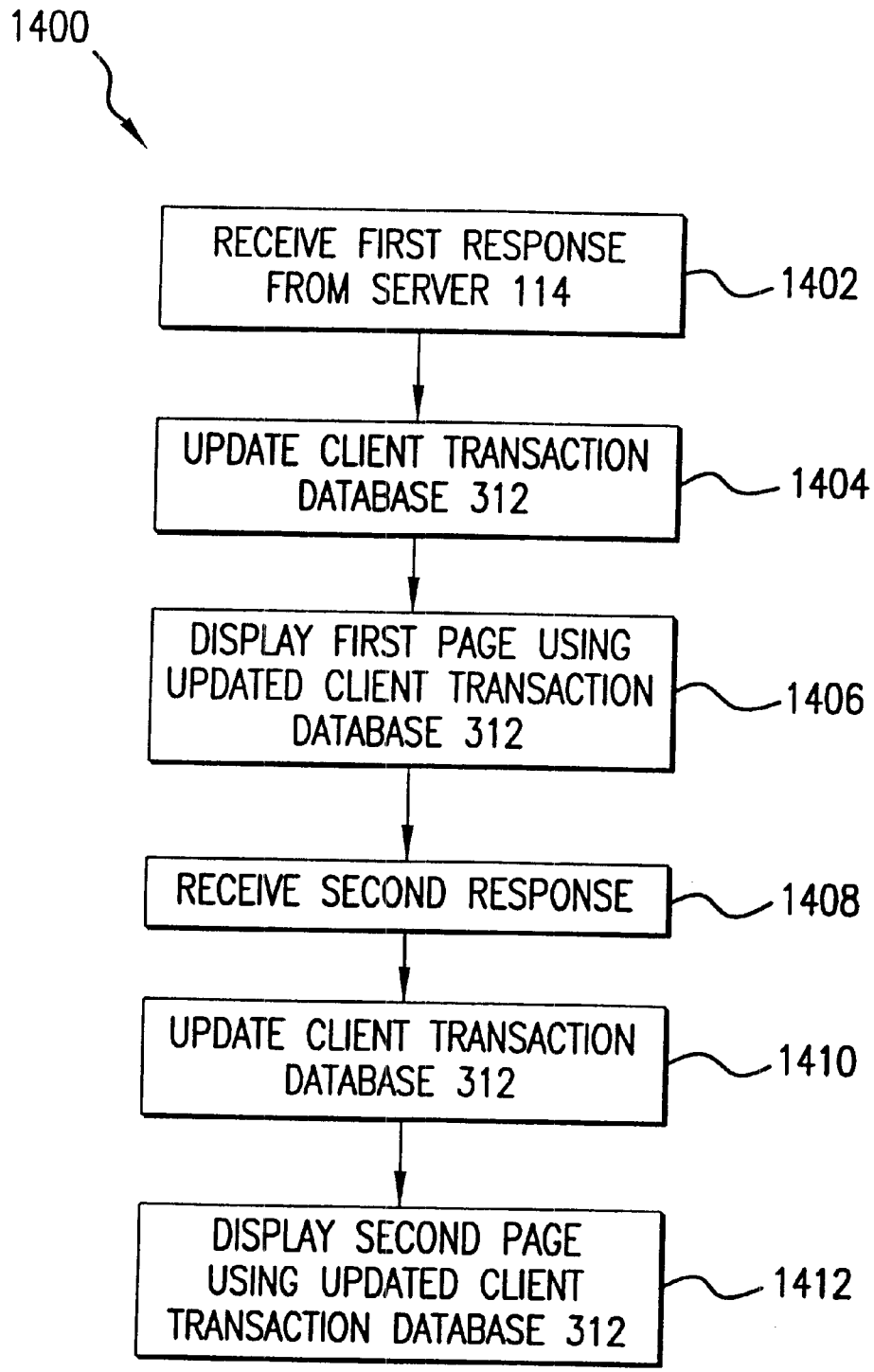
FIG. 14 is a flow chart of an exemplary method of receiving multiple responses to multiple requests at a client device.

Assume client device 108 sends a first request message to server 114 and then a second request message to server 114 prior to receiving a response message to the first request message. Referring to FIG. 14, at an initial step 1402, client device 108 receives a response to the first request. In a step 1404, client device 108 updates a row of client transaction database table 800 based on the response to the first request. For example, client device 108 updates a first row of transaction database table 800 using first information that is based on the response to the first request. Client device 108 uses the template identifier (e.g., 906) in the response message (e.g., 920) to determine which row to update. Next, in a step 1406, client device 108 displays a first page using the first information in the updated first row of client transaction database table 800.

Next, in a step 1408, client device 108 receives a response to the second request. In a step 1410, client device 108 updates a row of client transaction database table 800 based on the response to the second request. For example, client device 108 updates a second row of transaction database table 800 using second information that is based on the response to the second request. Again, client device 108 uses the template identifier (e.g., 906) in the second response message (e.g., 920) to determine which row to update. At a step 1412, client device 108 can then display a second page using the second information in the updated second row of client transaction database table 800, in response to a request by the user via the user interface 312 (e.g., in response to the pressing of a back arrow key). Accordingly, the use of client transaction database 312 enables client device 108 to send one or more additional request messages to server 114 (or multiple servers 114), prior to receiving response message(s) to one or more previous requests (i.e., back from server 114), without the additional request(s) negating the previous request(s).

In one embodiment, the display page relating to the last made client request is displayed first, regardless of which server response is first received at client device 108. In still another embodiment, a display page relating to the first made client request is displayed first, regardless of which server response is first received at client device 108.

The present invention can be used to improve many systems and applications. For example, when the present invention is used in a browser application, and a user (i.e., of the browser) submits numerous consecutive information and/or branch requests over a relatively short period of time, the transaction database of the present invention stores multiple responses to the numerous requests. The user of the browser can then peruse the pages associated with the numerous responses at his or her convenience. That is, the present invention stores the numerous responses in a transaction database enabling the user to retrieve information and/or navigate through a plurality of service provider sites (such as an Internet web pages) one after another (without requiring either further user action, except, for example, a next or previous request, or the browser to again retrieve information and/or navigate to a site).

In contrast, when using a conventional browser (such as Microsoft Internet Explorer), each consecutive request effectively cancels or negates a previous request, whereby one or more information and/or branch requests are disadvantageously lost to the user. For example, when a user of a conventional browser issues a first request for a first Internet file (e.g., by designating a Uniform Resource Locator (URL)) and then issues a second request for a different Internet file, prior to receiving a response to the first request, the conventional browser will never display a response to the first request. Accordingly, from the user's perspective, the second request negates the first request. This can also occur when the user navigates through web sites. For example, if the user "clicks" on a first hypertext link and then "clicks" on a second hypertext link prior to a jump to the first link, a jump to the first link fails to occur. Thus, initiating the second link effectively negated initiating the first link. The present invention can be used to overcome these disadvantages of a conventional browser, as is now described with reference to FIG. 15.

Figure 15:
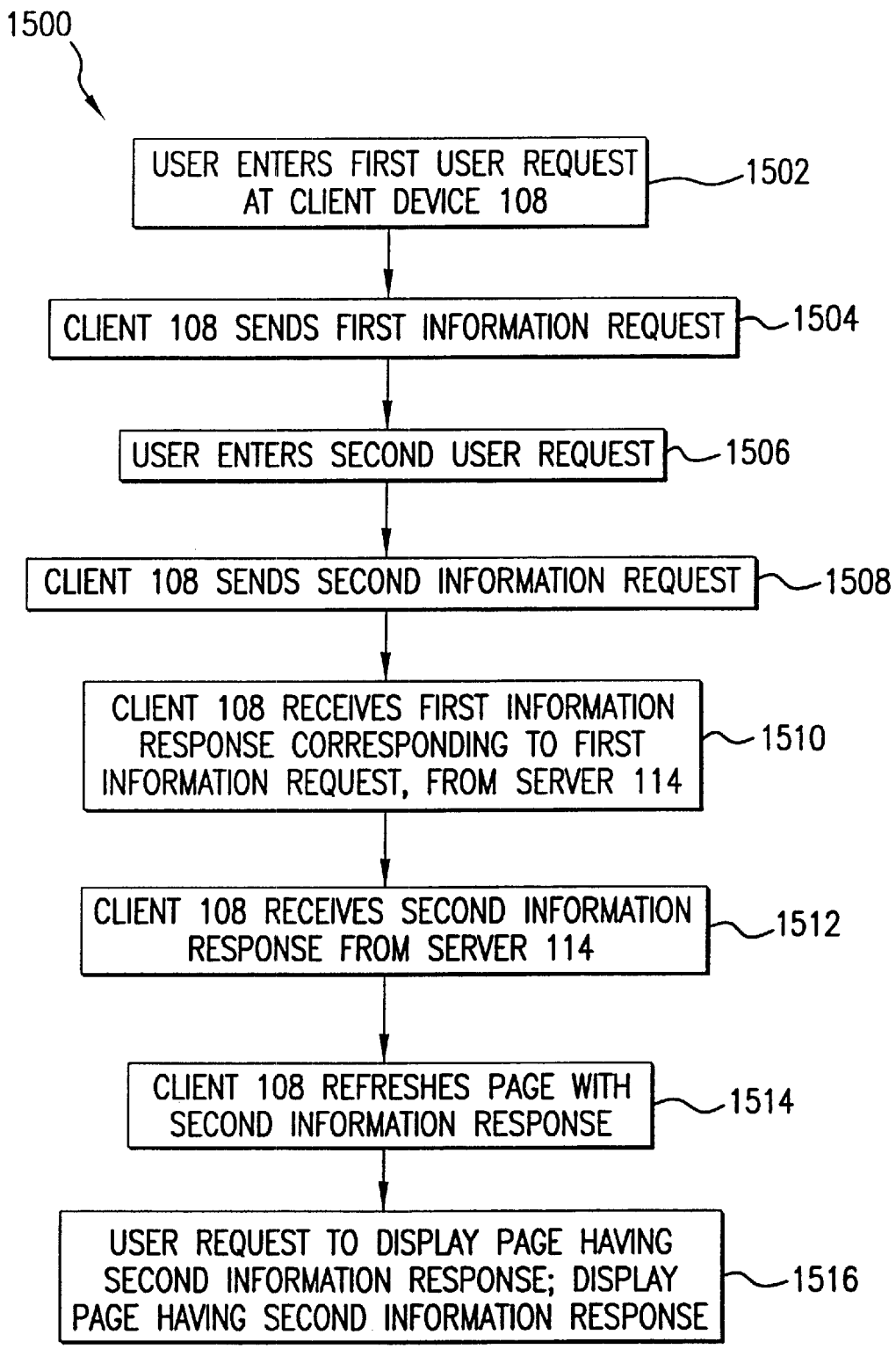
FIG. 15 is a flowchart of another exemplary method of receiving multiple responses to multiple requests at a client device.

FIG. 15 is a flow chart 1500 of an exemplary method overcoming the above mentioned disadvantages of a conventional browser. The method steps in FIG. 15 correspond to steps at client device 108. At a first step 1502, the user enters a first user request, for example, a page refresh command, via user interface 108. In response to the first user request, at a next step 1504, client device 108 sends a first information request to server 114.

At a next step 1506, the user enters a second user request via user interface 108. The first and second user requests can be issued from respective first and second display pages. Also, the time separation between the first and second user requests can range between milliseconds and hours or even days. In response to the second user request, at a next step 1508, client device 108 sends a second information request to server 114.

At a next step (not shown) server 114 composes first and second information responses corresponding to the first and second information requests and then transmits the first and second information responses. At a next step 1510, client device 108 receives the first information response and stores first information associated with the first information response in client transaction database 310. At a next step 1512, client device 108 receives the second information response and stores second information associated with the second information response in client transaction database 310. The time separation between receipt of the first and second server responses can range between milliseconds and hours or even days. Also, in another embodiment, the order of receipt of the first and second responses is reversed.

At a next step 1514, client device 108 refreshes a display page associated with the second user request with the second information. In response to another user request, at a next step 1516, client device 108 retrieves the first information from client transaction database 312 and displays the first information to a display page.

In this manner, client device 108 receives, retains, and displays as required, multiple server responses to multiple, consecutive information requests, regardless of the order in which the requests were issued or the responses were received.

F.1. Hardware and Software Implementations

Figure 16:
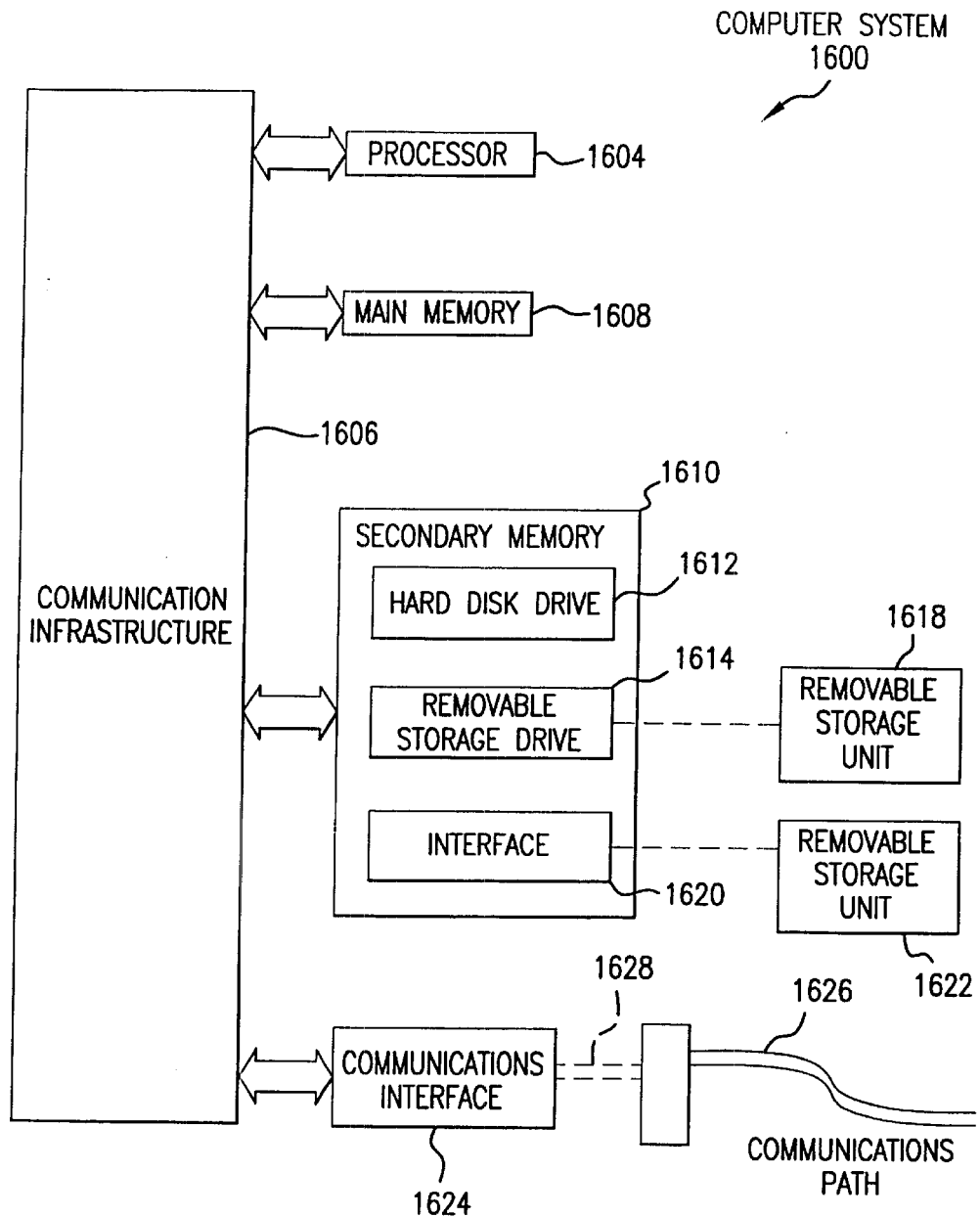
FIG. 16 is an exemplary computer system which may be used to perform the operations of the present invention.

Server 114 can perform specific features of the present invention using server controllers, which in effect comprise a computer system. Although communication-specific hardware can be used to implement the present invention, the following description of a general purpose computer system is provided for completeness. The present invention is preferably implemented in software. Alternatively, the invention may be implemented using hardware or a combination of hardware and software. Consequently, the invention may be implemented in a computer system or other processing system. An example of such a computer system 1600 is shown in FIG. 16. In the present invention, for example, client and server applications 304 and 306 each executes on distinct computer systems 1600. The computer system 1600 includes one or more processors, such as processor 1604. The processor 1604 is connected to a communication infrastructure 1606 (for example, a bus or network). Various software implementations are described in terms of this exemplary computer system. After reading this description, it will become apparent to a person skilled in the relevant art how to implement the invention using other computer systems and/or computer architectures.

Computer system 1600 also includes a main memory 1608, preferably random access memory (RAM), and may also include a secondary memory 1610. The secondary memory 1610 may include, for example, a hard disk drive 1612 and/or a removable storage drive 1614, representing a floppy disk drive, a magnetic tape drive, an optical disk drive, etc. The removable storage drive 1614 reads from and/or writes to a removable storage unit 1618 in a well known manner. Removable storage unit 1618, represents a floppy disk, magnetic tape, optical disk, etc. which is read by and written to by removable storage drive 1614. As will be appreciated, the removable storage unit 1618 includes a computer usable storage medium having stored therein computer software and/or data.

In alternative implementations, secondary memory 1610 may include other similar means for allowing computer programs or other instructions to be loaded into computer system 1600. Such means may include, for example, a removable storage unit 1622 and an interface 1620. Examples of such means may include a program cartridge and cartridge interface (such as that found in video game devices), a removable memory chip (such as an EPROM, or PROM) and associated socket, and other removable storage units 1622 and interfaces 1620 which allow software and data to be transferred from the removable storage unit 1622 to computer system 1600.

Computer system 1600 may also include a communications interface 1624. Communications interface 1624 allows software and data to be transferred between computer system 1600 and external devices. Examples of communications interface 1624 may include a modem, a network interface (such as an Ethernet card), a communications port, a PCMCIA slot and card, etc. Software and data transferred via communications interface 1624 are in the form of signals 1628 which may be electronic, electromagnetic, optical or other signals capable of being received by communications interface 1624. These signals 1628 are provided to communications interface 1624 via a communications path 1626. Communications path 1626 carries signals 1628 and may be implemented using wire or cable, fiber optics, a phone line, a cellular phone link, an RF link and other communications channels.

In this document, the terms "computer program medium" and "computer usable medium" are used to generally refer to media such as removable storage drive 1614, a hard disk installed in hard disk drive 1612, and signals 1628. These computer program products are means for providing software to computer system 1600.

Computer programs (also called computer control logic) are stored in main memory 1608 and/or secondary memory 1610. Computer programs may also be received via communications interface 1624. Such computer programs, when executed, enable the computer system 1600 to implement the present invention as discussed herein. In particular, the computer programs, when executed, enable the processor 1604 to implement the process of the present invention. Accordingly, such computer programs represent controllers of the computer system 1600. In a preferred embodiment of the invention, the processes performed by server 114 and server application 306, and by client device 108 and client application 304, are all performed by computer control logic. Also, client and server template databases 310 and 330, and client and server transaction databases 312 and 332 are stored in respective memories 1608 and/or respective memories 1610. Where the invention is implemented using software, the software may be stored in a computer program product and loaded into computer system 1600 using removable storage drive 1614, hard drive 1612 or communications interface 1624.

In another embodiment, features of the invention are implemented primarily in hardware using, for example, hardware components such as application specific integrated circuits (ASICs). Implementation of the hardware state machine so as to perform the functions described herein will be apparent to persons skilled in the relevant art(s).

V Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

All cited patent documents and publications in the above description are incorporated herein by reference.

What is claimed is:

1. In a client-server system including one or more servers and a client device having a client transaction database and a user interface adapted to enable a user to enter requests, a method for enabling the client device to accept multiple user requests, receive multiple server responses, and display pages relating to the multiple server responses, the method comprising the steps of:

a. receiving a first user request from the user via the user interface;

b. sending a first client request based on said first user request;

c. receiving a second user request from the user via the user interface, prior to receiving a response to said first client request;

d. sending a second client request based on said second user request;

f. receiving a server response to said first client request;

g. storing first information in the client transaction database, said first information based on said server response to said first client request;

h. receiving a server response to said second client request; and i. storing second information in the client transaction database, said second information based on said server response to said second client request.

2. The method of claim 1, further comprising the steps of:

j. retrieving one of said first information and said second information from the client transaction database;

k. displaying one of a first display page relating to said first information and a second display page relating to said second information;

m. retrieving the other one of said first information and said second information from the client transaction database, in response to a further user request from the user via the user interface; and n. displaying the other one of said first display page and said second display page.

3. The method of claim 2, wherein when steps f. and g. occur prior to steps h. and i., and the method further comprises the steps of:

retrieving said first information from the client transaction database; and displaying said first display page.

4. The method of claim 3, wherein when steps f. and g. occur prior to steps h. and i., and the method further comprises the steps of:

retrieving said second information from the client transaction database, in response to said further user request; and displaying said second display page.

5. The method of claim 2, wherein when steps h. and i. occur prior to steps f. and g., and the method further comprises the steps of:

retrieving said second information from the client transaction database; and displaying said second display page.

6. The method of claim 5, wherein when steps h. and i. occur prior to steps f. and g., and the method further comprises the steps of:

retrieving said first information from the client transaction database, in response to said further user request; and displaying said first display page.

7. A client apparatus for communicating with a server via a communications system, the client apparatus comprising:

a user interface adapted to receive user requests from users;

a first client controller adapted to compose a plurality of client requests based on said user requests;

a transmitter that transmits client requests in the same order that said first client controller composes said plurality of client requests;

a receiver that receives server responses;

a second client controller adapted to store information relating to said server responses in a client transaction database in the same order that said receiver receives said client server responses; and a third client controller adapted to retrieve said information from said client transaction database in the same order that said receiver receives said client server responses and to display pages relating to said information retrieved from said client transaction database on a display.

8. The apparatus of claim 7, wherein when said user interface receives a first user request prior to receiving a second user request, then said first client controller composes a first client request based on said first user request prior to composing a second client request based on said second client request, and said transmitter transmits said first client request prior to said second client request.

9. The apparatus of claim 8, wherein when said receiver receives a first server response to said first client request prior to receiving a second server response to said second client request, then said second client controller stores first information based on said first server response prior to storing second information based on said second server response in said client transaction database, and said third client controller retrieves said first information from said client transaction database and displays a first page relating to said first information on said display.

10. The apparatus of claim 9, wherein, in response to said user interface receiving a further user request, said third client controller retrieves said second information from said client transaction database and displays a second page relating to said second information.

11. The apparatus of claim 8, wherein when said receiver receives a second server response to said second client request prior to receiving a first server response to said first client request, then said second client controller stores second information based on said second server response prior to storing first information based on said first server response in said client transaction database, and said third client controller retrieves said second information from said client transaction database and displays a second page relating to said second information on said display.

12. The apparatus of claim 11, wherein, in response to said user interface receiving a further user request, said third client controller retrieves said first information from said client transaction database and displays a first page relating to said first information.

* * * * *